(12) United States Patent
Melvin et al.

(10) Patent No.: US 8,072,884 B2
(45) Date of Patent: *Dec. 6, 2011

(54) METHOD AND SYSTEM FOR OUTPUT FLOW CONTROL IN NETWORK MULTIPLEXERS

(75) Inventors: Bruce W. Melvin, Roseville, CA (US); Robert L. Faulk, Jr., Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2025 days.

This patent is subject to a terminal disclaimer.

(21) Appl. No.: 10/730,390

(22) Filed: Dec. 8, 2003

(65) Prior Publication Data

US 2004/0081094 A1   Apr. 29, 2004

Related U.S. Application Data

(63) Continuation of application No. 09/449,841, filed on Nov. 26, 1999, now Pat. No. 6,697,330.

(51) Int. Cl.
*H04L 12/26* (2006.01)
*H04L 12/54* (2006.01)

(52) U.S. Cl. .................. 370/235; 370/412; 370/429

(58) Field of Classification Search .............. 370/389, 370/273, 401, 236.1, 236, 412–419, 428–429, 370/229–235

See application file for complete search history.

(56) References Cited

U.S. PATENT DOCUMENTS

| | | | | |
|---|---|---|---|---|
| 5,165,021 A | * | 11/1992 | Wu et al. | 709/234 |
| 5,455,820 A | * | 10/1995 | Yamada | 370/395.71 |
| 5,701,292 A | * | 12/1997 | Chiussi et al. | 370/232 |
| 5,790,770 A | * | 8/1998 | McClure et al. | 709/231 |
| 5,933,429 A | * | 8/1999 | Bubenik et al. | 370/392 |
| 5,946,325 A | * | 8/1999 | Shiota | 370/474 |
| 5,953,335 A | * | 9/1999 | Erimli et al. | 370/390 |
| 6,052,376 A | * | 4/2000 | Wills | 370/419 |
| 6,115,356 A | * | 9/2000 | Kalkunte et al. | 370/229 |
| 6,167,054 A | * | 12/2000 | Simmons et al. | 370/422 |
| 6,192,028 B1 | * | 2/2001 | Simmons et al. | 370/229 |
| 6,192,422 B1 | * | 2/2001 | Daines et al. | 710/29 |
| 6,282,172 B1 | * | 8/2001 | Robles et al. | 370/230 |
| 6,405,258 B1 | * | 6/2002 | Erimli et al. | 709/235 |
| 6,496,516 B1 | * | 12/2002 | Dabecki et al. | 370/460 |
| 6,539,024 B1 | * | 3/2003 | Janoska et al. | 370/412 |
| 6,570,848 B1 | * | 5/2003 | Loughran et al. | 370/230.1 |
| 6,614,756 B1 | * | 9/2003 | Morgenstern et al. | 370/230 |
| 6,661,802 B1 | * | 12/2003 | Homberg et al. | 370/412 |
| 6,724,767 B1 | * | 4/2004 | Chong et al. | 370/412 |
| 6,795,442 B1 | * | 9/2004 | Clayton et al. | 370/395.41 |
| 6,977,894 B1 | * | 12/2005 | Achilles et al. | 370/235 |
| 7,002,911 B1 | * | 2/2006 | Linville et al. | 370/230 |

* cited by examiner

*Primary Examiner* — Kwang B Yao
*Assistant Examiner* — Candal Elpenord

(57) ABSTRACT

A method and system for initiating selective flow control within a network multiplexer. Each port of a network multiplexer is associated with high and low threshold values, as well as a list of indications of ports that have requested the port to initiate flow control and a list of indications of ports which the port has requested to initiate flow control. A port that, by queuing a message descriptor to the transmit queue of a destination port, causes the number of message descriptors queued to the transmit queue of a destination port to equal or exceed its high threshold, is flow controlled by the destination port. When the number of message descriptors queued to the transmit queue of a destination port that previously equaled or exceeded the high threshold falls below the low threshold, all ports flow controlled by the destination ports are released from flow control.

10 Claims, 27 Drawing Sheets

```
1  const FORWARD_AFTER_CONTROL=2;
2  typedef void (*callbackFunction)();
3
4  class message
5  {
6     private:
7             char msg[1000];
8             int  msgNo;
9     public:
10            int   getLength();
11            int   getSource();
12            int   getDestination();
13            char* getMessage();
14            void  setNo (int no);
15            int   getNo();
16            message();
17            ~message();
18 };
19
20 class messageDescriptor
21 {
22    private:
23            message* msgPtr;
24            bool     flag;
25
26    public:
27            message* getMsg();
28            void     setMsg(message *m);
29            void     zeroFlag();
30            bool     getFlag();
31            bool     query();
32            messageDescriptor();
33            ~messageDescriptor();
34 };
35
```

*Fig. 14A*

```
36 class cQueue
37 {
38    private:
39            messageDescriptor queue[QUEUE_SIZE];
40            int head;
41            int tail;
42            bool inc(int & ptr);
43            bool dec(int & ptr);
44
45    public:
46            bool empty();
47            bool full();
48            int  num();
49            bool queueMDesc (messageDescriptor & msg);
50            bool dequeueMDesc (messageDescriptor & msg);
51            cQueue();
52            virtual ~cQueue();
53 };
54
55 class transceiver
56 {
57    public:
58
59            flowControl();
60            releaseFlowControl();
61            kick();
62            startTransceiver(cQueue *out, callbackFunction signalSend,
63                             cQueue *in, callbackFunction signalReceive);
64            transceiver();
65            ~transceiver();
66 };
67
68 class port;
69
70 class portList
71 {
72    public:
73            addPort (port *p);
74            removePort(port *p);
75            port* firstPort();
76            port* nextPort();
77            bool in(port *p);
78            bool empty();
79            bool clear();
80 };
81
```

*Fig. 14B*

```
82 class portDirectory
83 {
84   public:
85         port *getPortFromSource(int sid);
86 };
87
88 class port
89 {
90   private:
91         cQueue receiveQueue;
92         cQueue transmitQueue;
93         bool overflow;
94         bool flowControlled;
95         int highThreshold;
96         int lowThreshold;
97         portList controlled;
98         portList controlledBy;
99         portDirectory* portDir;
100        transceiver portHardware;
101
102  public:
103        void receiveMessage(messageDescriptor m, port *sPort);
104        void incomingMessage();
105        void outgoingMessage();
106        void receiveFlowControl(port *sPort);
107        void receiveFlowControlRelease(port *sPort);
108        port(portDirectory *p, int low, int high);
109        ~port();
110 };
```

*Fig. 14C*

```
1  void port::receiveMessage(messageDescriptor m, port *sPort)
2  {
3      if (transmitQueue.num() > highThreshold - 2)
4      {
5              if (!controlled.in(sPort))
6              {
7                      sPort->receiveFlowControl(this);
8                      controlled.addPort(sPort);
9              }
10             overflow = TRUE;
11     }
12     if (!transmitQueue.full())
13     {
14             transmitQueue.queueMDesc(m);
15             portHardware.kick();
16     }
17 }
18
19 void port::incomingMessage()
20 {
21     messageDescriptor m;
22     port *p;
23
24     if (controlledBy.empty())
25     {
26             if (flowControlled)
27             {
28                     flowControlled = FALSE;
29                     portHardware.releaseFlowControl();
30             }
31             while (!receiveQueue.empty() && !flowControlled)
32             {
33                     receiveQueue.dequeueMDesc(m);
34                     p = portDir->getPortFromSource((m.getMsg())->getSource());
35                     p->receiveMessage(m, p);
36             }
37             portHardware.kick();
38     }
39 }
40
```

*Fig. 14D*

```
41 void port::outgoingMessage()
42 {
43     port* nxt;
44
45     if (overflow && transmitQueue.num() < lowThreshold)
46     {
47             overflow = FALSE;
48             nxt = controlled.firstPort();
49             while (nxt)
50             {
51                     nxt->receiveFlowControlRelease(this);
52                     nxt = controlled.nextPort();
53             }
54             controlled.clear();
55     }
56 }
57
58 void port::receiveFlowControl(port *sPort)
59 {
60     int num = FORWARD_AFTER_CONTROL;
61     messageDescriptor m;
62     port *p;
63
64     controlledBy.addPort(sPort);
65     portHardware.flowControl();
66
67     //optional
68     while (num-- && !receiveQueue.empty())
69     {
70             receiveQueue.dequeueMDesc(m);
71             p = portDir->getPortFromSource((m.getMsg())->getSource());
72             p->receiveMessage(m, p);
73     }
74 }
75
```

*Fig. 14E*

```
76 void port::receiveFlowControlRelease(port *sPort)
77 {
78      controlledBy.removePort(sPort);
79      incomingMessage();
80 }
81 port::port(portDirectory *p, int low, int high)
82 {
83              cQueue* t = &(transmitQueue);
84              cQueue* r = &(receiveQueue);
85              overflow = FALSE;
86              flowControlled = FALSE;
87              highThreshold = high;
88              lowThreshold = low;
89              portDir = p;
90              portHardware.startTransceiver(t, port::outgoingMessage(),
91                                           r, port::incomingMessage());
92 }
```

*Fig. 14F*

METHOD AND SYSTEM FOR OUTPUT FLOW CONTROL IN NETWORK MULTIPLEXERS

CROSS REFERENCE

This application is a continuation of application Ser. No. 09/449,841, filed Nov. 26, 1999, now U.S. Pat. No. 6,697,330.

TECHNICAL FIELD

The present invention relates to resource allocation in networking multiplexers and, in particular, to a method and system for selective flow control of network media connected to a network multiplexer in order to prevent unfair resource allocation or resource blocking within a network multiplexer.

BACKGROUND OF THE INVENTION

Bridges, switches, and routers are types of network multiplexers that receive communications packets, also called messages, from network media, such as ethernets, and forward the received communications packets to one or more network media. Network multiplexers serve to link physically separate network media into a single network. A network multiplexer contains a number of ports through which separate physical network media are coupled to the network multiplexer. Each port is associated with a receive queue that contains message descriptors pointing to memory locations in which received communications packets are stored, and are associated with transmit queues containing message descriptors that point to communications packets stored in memory for transmission by the port. A network multiplexer forwards received communications packets by moving message descriptors from receive queues to transmit queues.

The receive queues, transmit queues, and memory for storing communications packets within a network multiplexer represent finite internal resources of the network multiplexer. Mismatches between the rates at which communications packets are received by a network multiplexer and the rates at which received communications packets may be transmitted by a network multiplexer can result in the exhaustion of certain internal resources of the network multiplexer, such as backup of receive and transmit queues, exhaustion of memory capacity within the network multiplexer, and, ultimately, discarded communications packets. When communications packets are discarded by the network multiplexer, or dropped, without being transmitted to their intended destinations, the loss of the communications packet is generally detected by the network node that originally transmitted the communications packet after a period of time and is then sent again by the network node that originally transmitted the communications packet. Retransmission of dropped communications packets introduces significant delays and possibilities for further problems and error conditions to arise. When certain network-multiplexer internal resources are exhausted, messages received via certain ports may be blocked from being forwarded to other ports while resources are monopolized by other ports. Such problems can be avoided by individually gating reception of communications packets via ports using network-hardware or network-protocol level flow control techniques. However, currently-available methods require complex and costly logic in order to monitor the use of portions of resources allocated to each port. Thus, designers, architects, and manufacturers of network multiplexers recognize the need for a simple method and system to selectively flow control the network media coupled to a network multiplexer in order to prevent communications packets from being discarded as a result of the exhaustion of internal network multiplexer resources.

SUMMARY OF THE INVENTION

The present invention provides a method and system for selectively applying flow control to network media coupled to a network multiplexer in order to prevent monopolization of resources and blocking of communications packet transfer between ports within the network multiplexer. High and low thresholds are assigned to each transmit queue within the network multiplexer. In addition, each port in the network multiplexer is associated with a list of ports from which the port has received a flow control directive. If the number of queued message descriptors in a transmit queue exceeds the high threshold, any port thereafter attempting to queue additional message descriptors to the transmit queue are directed by the port associated with the transmit queue to undertake flow control on their associated network media in order to temporarily prevent reception of additional communications packets. Once the number of message descriptors queued to the transmit queue falls below the low threshold, all ports to which the port associated with the transmit queue has sent flow control directives are sent release flow control messages so that these ports can discontinue flow control and resume receiving communications packets. A flow controlled port remains flow controlled until all outstanding flow control directives have been removed by subsequent release flow control messages. By the method of the present invention, internal multiplexer conditions under which communications packets need to be dropped are prevented from occurring.

BRIEF DESCRIPTION OF THE DRAWINGS

FIGS. 14A-F provide a C++-like pseudo-code implementation of the method of the present invention.

DETAILED DESCRIPTION OF THE INVENTION

Figure 1:
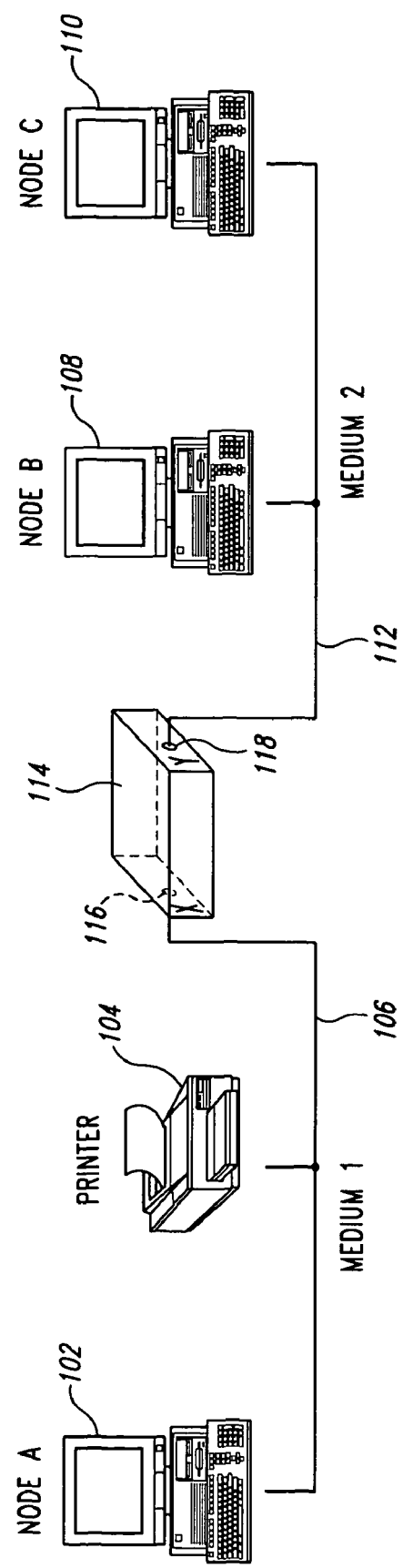
FIG. 1 displays a simple communications network comprising two physically separate network media linked together by a network multiplexer.

Switches, routers, and bridges are multi-port communications network infrastructure devices that forward communications network packets received from transmitting network devices on or more source network media to receiving network devices on one or more destination network media. Switches, routers, and bridges are all examples of network multiplexers. FIG. 1 displays a simple communications network comprising two physically separate network media linked together by a network multiplexer. A network medium may, be a single ethernet, token ring, or other similar communications network physical transport medium to which a number of network devices, such as computers, printers, disk arrays, and network multiplexers, are attached. In FIG. 1, a computer system 102 and a printer 104 are linked together via a first network medium 106. A second computer system 108 and a third computer system 110 are linked together by a second network medium 112. Both the first and second network media 106 and 112 are linked together by a network multiplexer 114. In the following discussion, the first, second, and third computer systems are referred to as "node A," node B," and "node C," respectively. The network multiplexer 114 allows node A 102 and the printer 104, linked together via network medium 106, to communicate with node B 108 and node C 110, linked together by network medium 112. The network multiplexer contains two ports, port "X" 116 and port "Y" 118. The network multiplexer 114 receives communications packets, or messages, from node A 102 and the printer 104 through port X 116 and transmits communications packets to node A 102 and the printer 104 through port "X" 116. In similar fashion, the network multiplexer 114 receives communications packets from, and transmits communications packets to, node B 108 and node C 110 via port "Y" 118.

Figure 2:
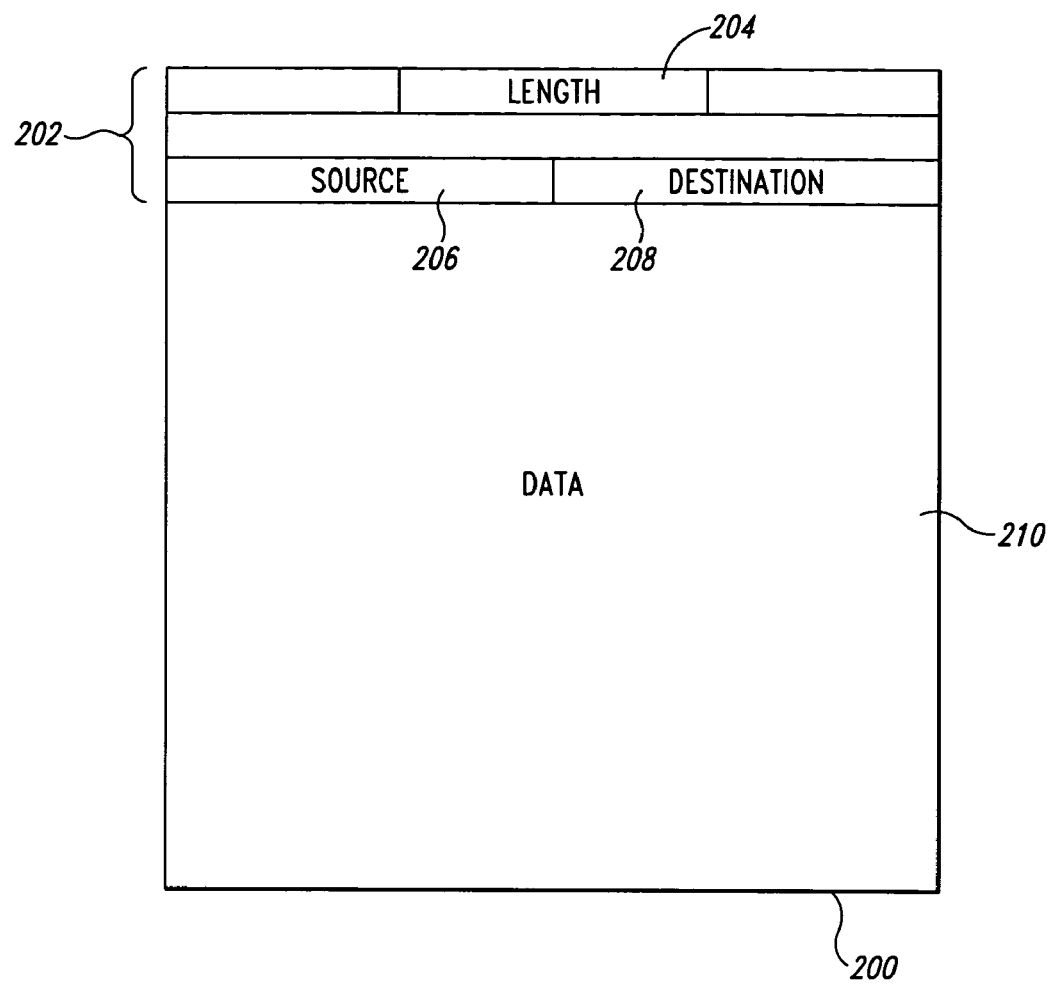
FIG. 2 shows a generalized representation of a communications packet.

FIG. 2 shows a generalized representation of a communications packet. A communications packet 200 is a sequence of computer bytes. Communications packets generally vary in length. A header 202 is a first, fixed-length and fixed-format portion of a communications packet. The header contains, among other information, numerical fields that indicate the total length of the communications packet 204, the address of the network device that originally transmitted the communications packet 206, and the address of the network device to which the communications packet is directed 208. Following the header is a variable length field that contains the computer data included in the communications packet 210. Depending on the type of communications medium, the header may contains many additional fields, including a sequence number and error correction codes, and the fields may occupy many different relative positions to one another and to the start of the header. The contents of the source and destination fields 206 and 208 of the header 202 are referred to as the "source address" and "destination address," respectively, in the following discussion.

Figure 3:
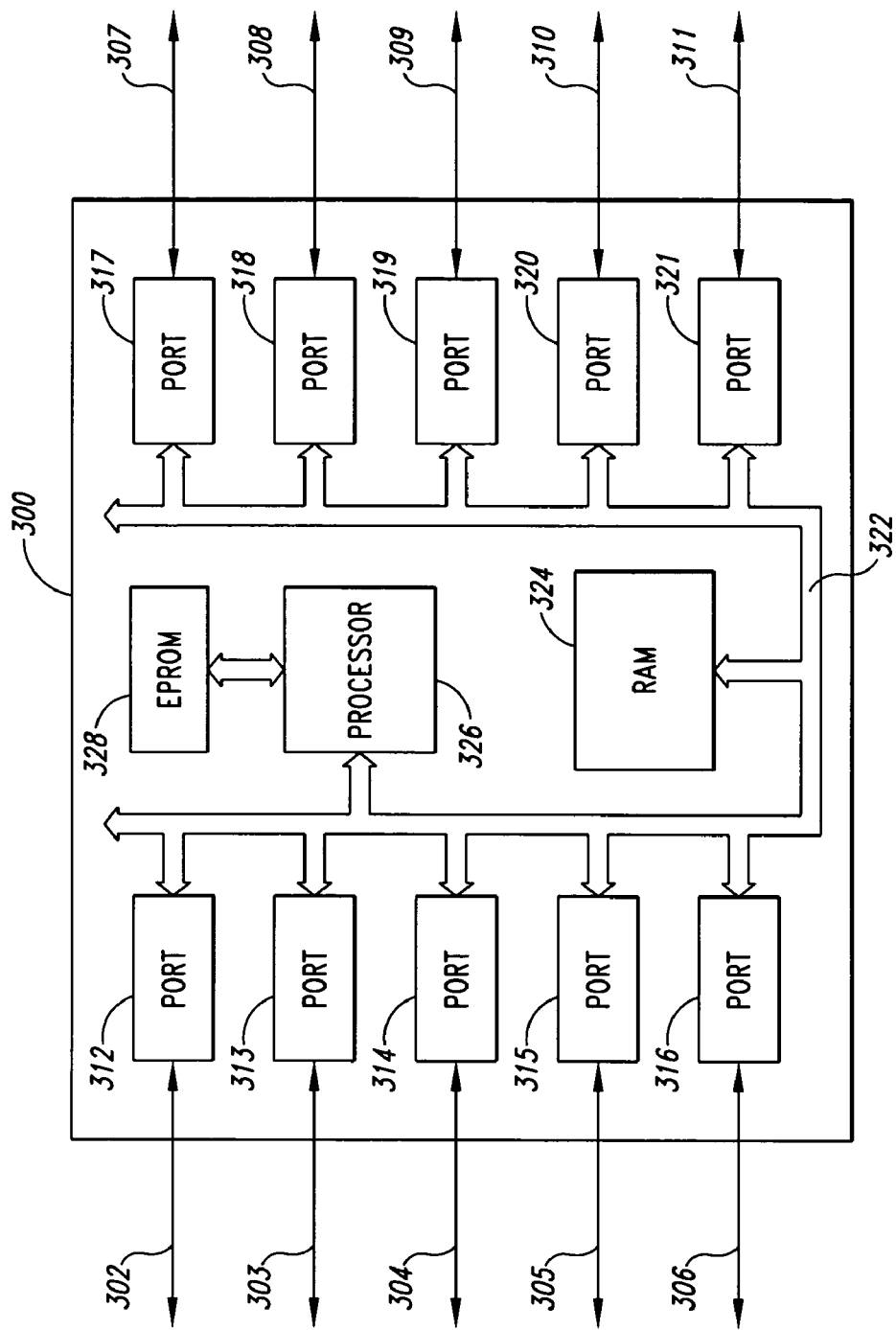
FIG. 3 shows a generalized block diagram of a network multiplexer.

FIG. 3 shows a generalized block diagram of a network multiplexer. The network multiplexer 300 is connected, in FIG. 3, to ten different network media 302-311. Within the network multiplexer, each network medium 302-311 is electronically connected to a port 312-321. Each port comprises a transceiver device that receives and transmits communications packets and control logic that interprets certain fields of the communications packets in order to implement the lower level networking protocols for the type of network media to which the port is connected, and, additionally, interfaces to an internal communications bus 322 and memory 324. A port may store received communications packets into known locations in the memory 324 and may retrieve communications packets for transmission from known locations in the memory 324. A network multiplexer may also contain a processor 326 and non-volatile memory 328 that stores control routines executed by the processor 326. Alternatively, in place of a processor and non-volatile memory, a network multiplexer may employ complex logic to control forwarding of communications packets from one port to another, or may employ a combination of a processor and specialized logic.

When a network multiplexer receives a communications packet from a port, the network multiplexer must determine whether to forward the received communications packet to another port or ports, or to drop the received communications packet. For example, if the network multiplexer 114 of FIG. 1 receives a communications packet from port X 118 with source address corresponding to node A 102 and destination address corresponding to the printer 104, the network multiplexer 114 may simply drop the received communications packet without forwarding the communications packet to port Y 118, assuming that network medium 106 is a broadcast-type medium in which the communications controllers of all networking devices connected to the network medium examine each communications packet transferred through the network medium. In the present case, both the printer 104 and the network multiplexer 114 will receive the communications packet transmitted from node A 102 to the printer 104, and there is no need for the network multiplexer to transmit the communications packet to the printer a second time. In fact, a second, duplicate transmission may cause problems for a receiving node, and for the node that originally transmitted the packet. However, in the case that node A 102 transmits a communications packet to node B 108, the network multiplexer 114 receives the transmitted communications packet on port X 116 and needs to transmit the communications packet via port Y 118 to network medium 112 in order for node B 108 to receive the communications packet, since because network media 106 and 112 are physically distinct. The network multiplexer 114 in FIG. 1 is the only bridge, or link, between network medium 106 and network medium 112. When the network media interconnected by a network multiplexer are of the same type and employ universal source and destination addresses, the network multiplexer may simply forward received packets. In other cases, the network multiplexer may need to reformat received packets prior to forwarding them.

Unfortunately, the network multiplexer does not contain a hard-wired, destination-address-to-port translation mechanism. Thus, in the previous example, when the network multiplexer 114 receives a communications packet on port X 116 from node A 102 addressed to node B 108, the network multiplexer has no hard-wired translation mechanism to determine to which of network media 106 and 112 node B is connected. In the case of ethernet network media, for example, 48-bit source and destination addresses are employed. Thus, there can be trillions of valid, unique ethernet device addresses. Ethernet devices receive their unique addresses at the time of manufacture, prior to their connection to a particular ethernet. Ethernet devices may be removed from one ethernet and connected to another ethernet following their initial connection to an ethernet. There is simply no way to assign an a priori correspondence between ethernet addresses and particular network media, and, even if there were a way to make an a priori assignment, the size of the assignment table would exceed any currently-available technology for economically storing such a volume of information within a network multiplexer.

One approach to addressing the above-mentioned problem is to provide network administrators with manual methods for entering the network addresses of devices into a network multiplexer along with their port assignments. A manually entered address is more or less static, and is changed only when the network administrator later removes the manually entered address or enters a new port assignment for the manually entered network address. This approach, as with all manual update approaches, may be slow, error prone, and expensive.

Figure 4:
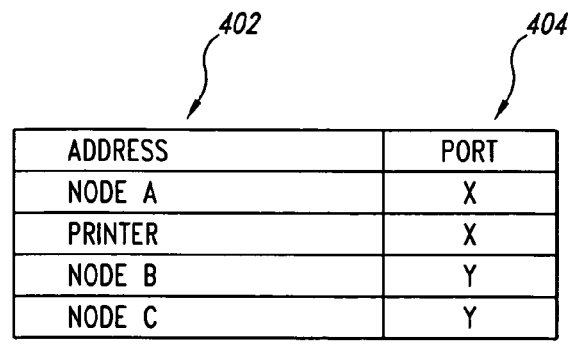
FIG. 4 shows an address table for the network of FIG. 1.

In order to provide for automated network address and port assignment recognition, but without employing a hard-wired translation mechanism, network multiplexers commonly learn the correspondence between network addresses and ports over time, and store the correspondences in an address table. FIG. 4 shows an address table for the network of FIG. 1. Each network address in the first column 402 of the address table is paired with a corresponding port in the second column 404 of the address table. Before the network multiplexer receives a communications packet originally transmitted by a network device having a particular network address, that particular network address will not appear in the address table. When the network multiplexer receives a communications packet with a destination network address that is not currently contained in the address table, the network multiplexer must forward the received communications packet to all the different network media to which the network multiplexer is connected, since the network multiplexer cannot determine to which port the destination address corresponds. After the network multiplexer receives a communications packet from a network device having the particular network address, a correspondence between the particular network address and the port through which the communications packet was received is entered by the network multiplexer into the address table. Then, whenever the network multiplexer receives a communications packet having that particular network address as the destination address of the communications packet, the network multiplexer can find the correspondence between the particular network address and a port in the address table, and can forward the communications packet to the correct port. In the case that the communications packet is received from the same port through which the communications packet would otherwise be forwarded, the network multiplexer can simply drop the packet without forwarding it.

Figure 5:
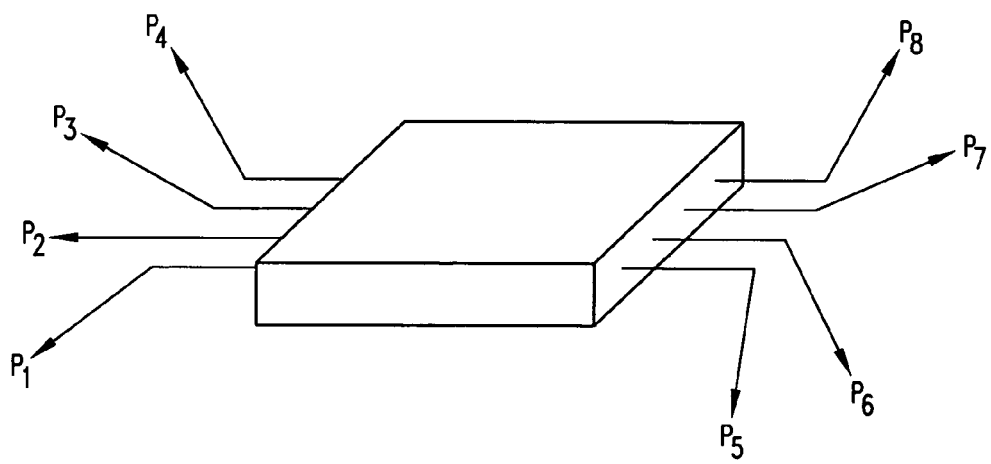
FIG. 5 displays a network multiplexer interconnecting eight different network media.
Figure 6:
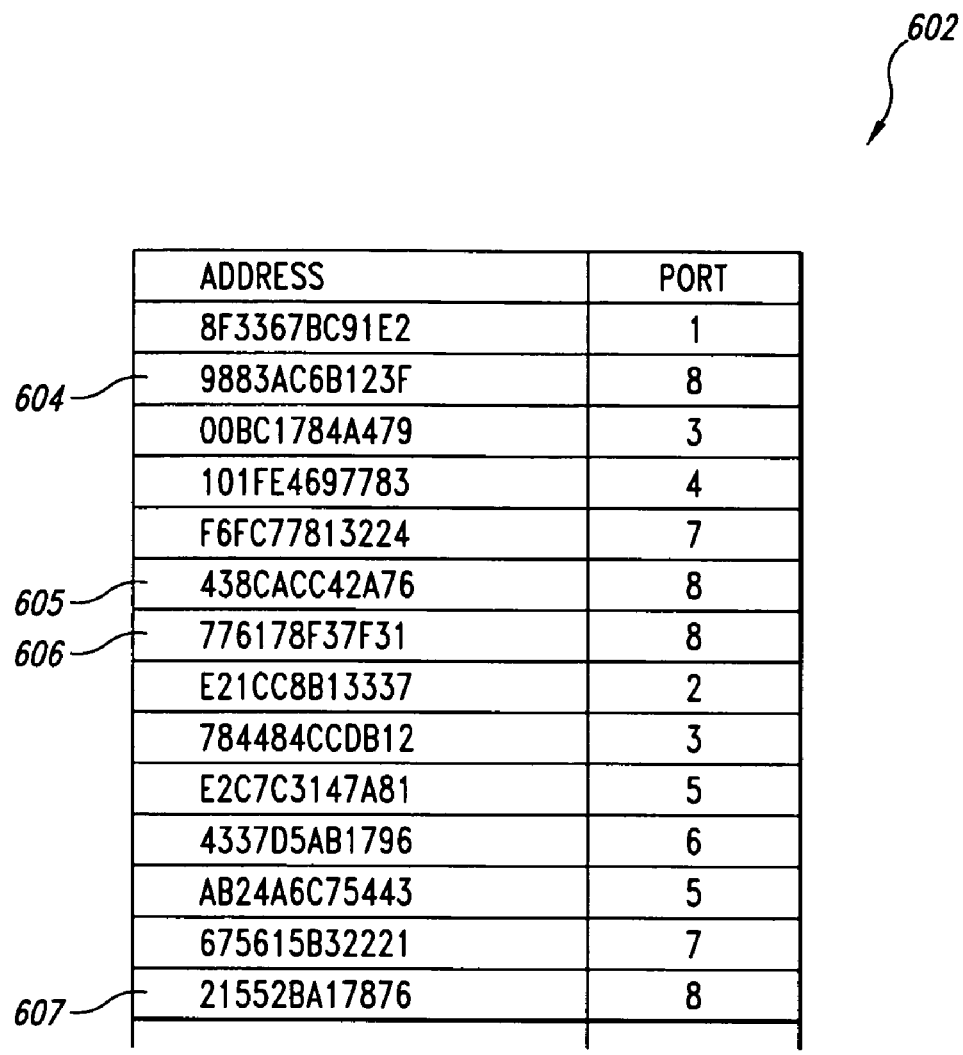
FIG. 6 shows a portion of an address table for the network multiplexer of FIG. 5.

Network multiplexers may be connected to a large number of different network media through a large number of corresponding ports. FIG. 5 displays a network multiplexer interconnecting eight networks, and FIG. 6 shows a portion of an address table for this network multiplexer. The address table 602 in FIG. 6 may contain many different network addresses corresponding to a particular port, such as network addresses 604-607 associated with the network medium connected to the network multiplexer via port 8.

Figure 7:
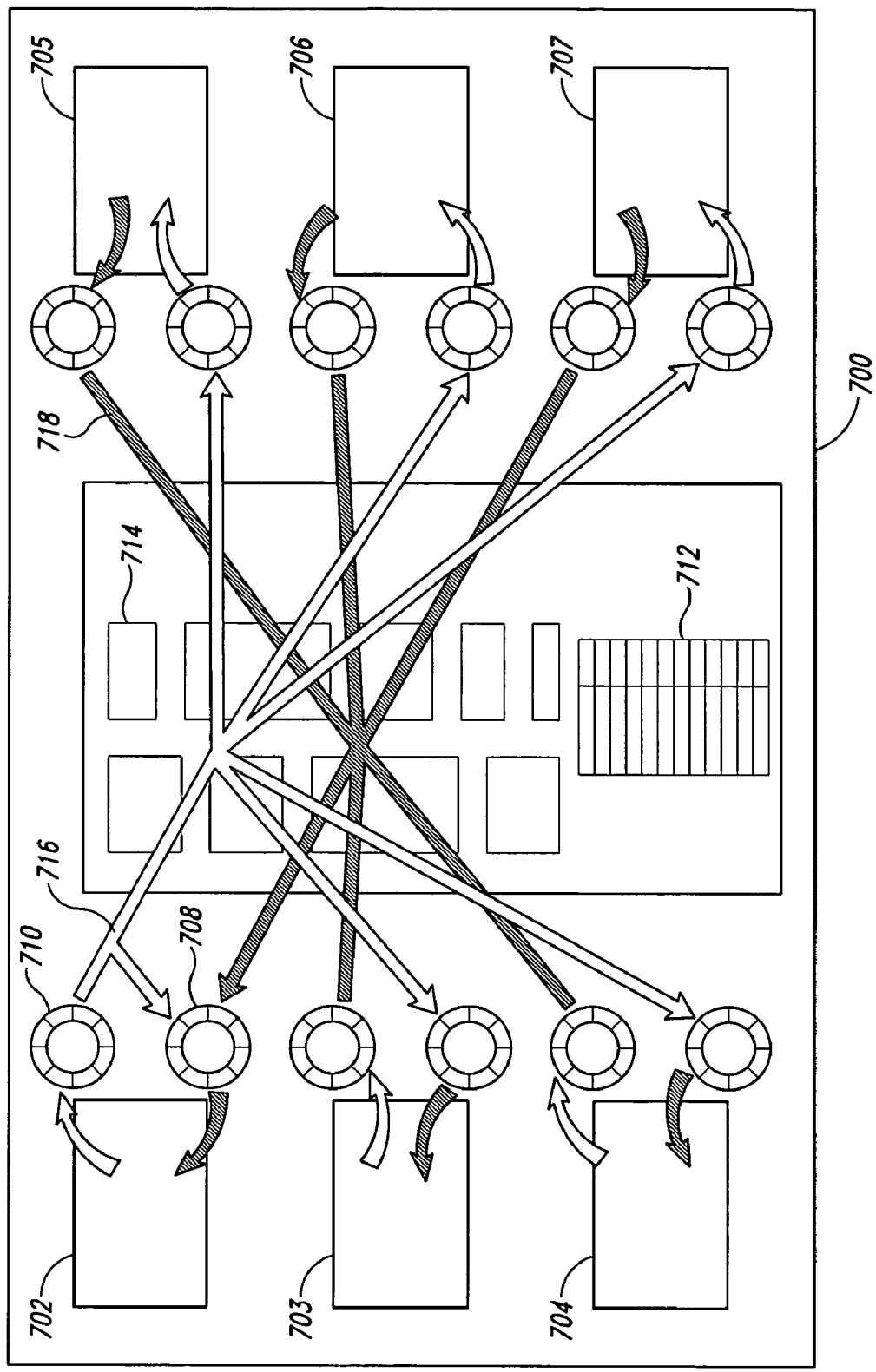
FIG. 7 illustrates the logical components of a network multiplexer.

FIG. 7 illustrates the logical components of a network multiplexer. The network multiplexer 700 of FIG. 7 includes six ports 702-707. Each port is associated with a transmit queue and a receive queue, such as the transmit queue 708 and the receive queue 710 associated with port 702. Both transmit and receive queues are composed of contiguous memory locations within the memory of the network multiplexer (324 in FIG. 3). The memory of the network multiplexer (324 in FIG. 3) is shown in FIG. 7 as also containing an address table 712 and various stored communications packets, such as stored communications packet 714. The transmit and receive queues, such as transmit and receive queues 708 and 710, contain message descriptors that indicate the memory locations of stored communications packets, such as stored communications packet 714, and may contain additional information fields. The communications controller components of the ports receive communications packets for transmission via message descriptors contained in transmit queues, and place communications packets received from the corresponding network medium into memory locations described by message descriptors contained in receive queues. A principle task of the network multiplexer is to move message descriptors from receive queues to transmit queues using information contained in the source and destination fields of the communications packet headers referenced by the message descriptors along with information stored in address table 712. For example, in FIG. 7, the multi-headed arrow 716 illustrates the transfer of message descriptors from the receive queue 710 of port 702 to the transmit queues of the remaining ports 703-707, and the multi-headed arrow 718 indicates the transfer of message descriptors from the receive queues of ports 703-707 to the transmit queue 708 of port 702. Equivalent systems of arrows can be drawn with respect to each of the remaining ports 703-707.

When the port 702 receives a communications packet from its corresponding network medium, the port obtains a memory location allocated for storage of an incoming communications packet, places the communications packet into memory starting at the obtained memory location, and stores a reference to the memory location, possibly along with additional information, into a message descriptor in the receive queue 710. Then, the network multiplexer moves the message descriptor that describes the location of the received communications packet from the receive queue 710 of port 702 to a transmit queue of one or more of the ports 702-707. Conversely, when one of ports 702-707 receives a communications packet with a destination address corresponding to a network device linked to the network medium associated with port 702, that port obtains a memory location into which the received communications packet is stored, and stores a reference to the memory location, possibly along with additional information, into a message descriptor in the receive queue associated with the port. The network multiplexer then transfers the message descriptor from the receive queue of the port that received the communications packet to the transmit queue 708 of port 702 to allow port 702 to forward the received communications packet to the network medium associated with port 702. Of course, in the case that destination network addresses cannot be found in the address table 712, as discussed above, then the network multiplexer must place copies of the message descriptor into each transmit queue of each port, a process called "flooding." The network multiplexer is responsible for maintaining message descriptors in the receive queues of all ports that refer to free locations in memory into which received communications packets can be stored. There are many well-known approaches to maintaining message descriptors in receive queues, and this aspect of network multiplexer logic will not be further discussed or treated in a subsequent illustrative pseudo-code implementation.

Figure 8:
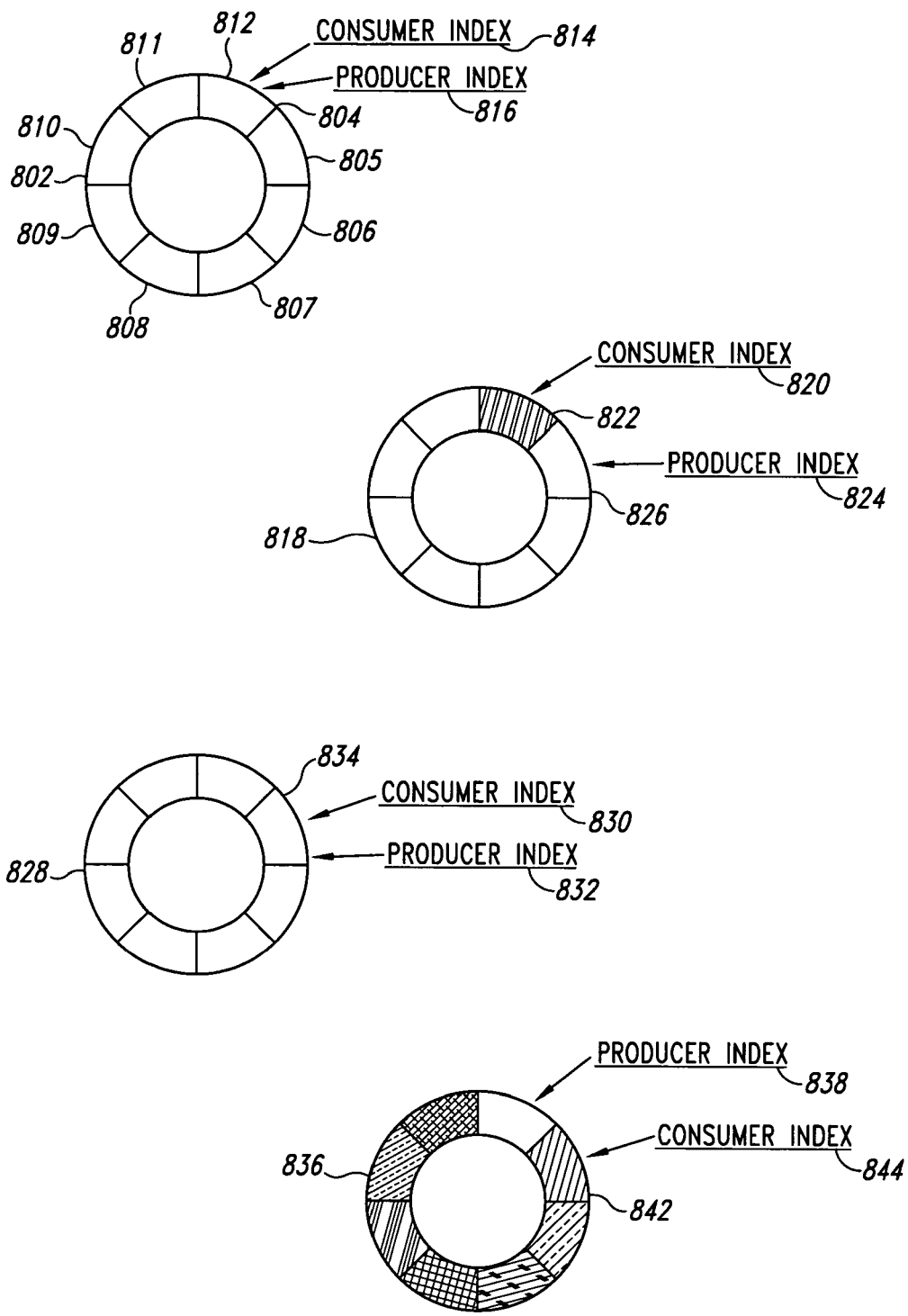
FIG. 8 illustrates the circular queue data structure used for transmit and receive queues in a network multiplexer.

Generally, circular queues are employed by network multiplexers and communications controllers for both receive queues and transmit queues. FIG. 8 illustrates the circular queue data structure used for transmit and receive queues in a network multiplexer. A circular queue is a first-in-first-out ("FIFO") queue that is logically represented in a circular fashion, such as the depiction of the circular queue 802 at the top of FIG. 8. Each radial section 804-812, or slot, of a circular queue contains space for a queue entry, in the case of network multiplexers, a message descriptor. The circular queue 802 in FIG. 8 is shown with 8 queue entry slots 804-812 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. Alternatively, the consumer index may be called the "tail" and the producer index may be called the "head." In an empty circular queue 802, in which all the queue entry slots are available for placement of data by a producer and in which none of the queue entry slots contain valid queue entries to be consumed by a consumer, both the consumer index 814 and the producer index 816 point to the same empty queue entry slot 812.

When a producer adds a queue entry to an empty circular queue 802, a circular queue with one valid queue entry 818 is produced. The consumer index 820 is not changed, as a result of which the consumer index points to the single valid queue entry 822 in the circular queue 818. After the producer inserts the queue entry 822, the producer increments the producer index 824 to point to the next available slot 826 within the circular queue 818 into which the producer can add a second queue entry. If the consumer now removes the single queue entry 822, an empty circular queue 828 is produced. When the consumer has removed the available queue entry 822, the consumer increments the consumer index 830. As in the previous depiction of an empty circular queue 802, the empty circular queue 828 produced by removing the single queue entry 822 has both the consumer index 830 and the producer index 832 pointing to the same empty, available queue entry slot 834. If a producer successively adds queue entries at a faster rate than a consumer can consume them, a full circular queue 836 will eventually be produced. In a full circular queue 836, the producer index 838 points to a single empty queue entry slot within the circular queue that immediately precedes the first available valid queue entry 842 pointed to by the consumer index 844.

Problems arise in a network multiplexer when disparities occur in the rates at which communications packets are received by network multiplexer ports and in the rate at which communications packets are transmitted by network multiplexer ports. In such cases, one or more transmit queues may become filled, and cannot be emptied before additional communications packets are received by the network multiplexer. In these cases, the multiplexer must drop the additional received communications packets. Particularly vexing, from the standpoint of network multiplexer designers and network developers, is that this circumstance may be obtained even when network flow control is invoked upon receive buffer overflow detection. The present invention is directed towards an economical and efficient method and system for avoiding this problem. This problem will be discussed with reference to FIGS. 9-11, a complete but uneconomical and complex solution to the problems will be discussed with reference to FIG. 12, and the method of the present invention will be illustrated in FIGS. 13A-J. Finally, in FIGS. 14A-F, a C++-like pseudo-code implementation of the method of the present invention is provided.

Figure 9:
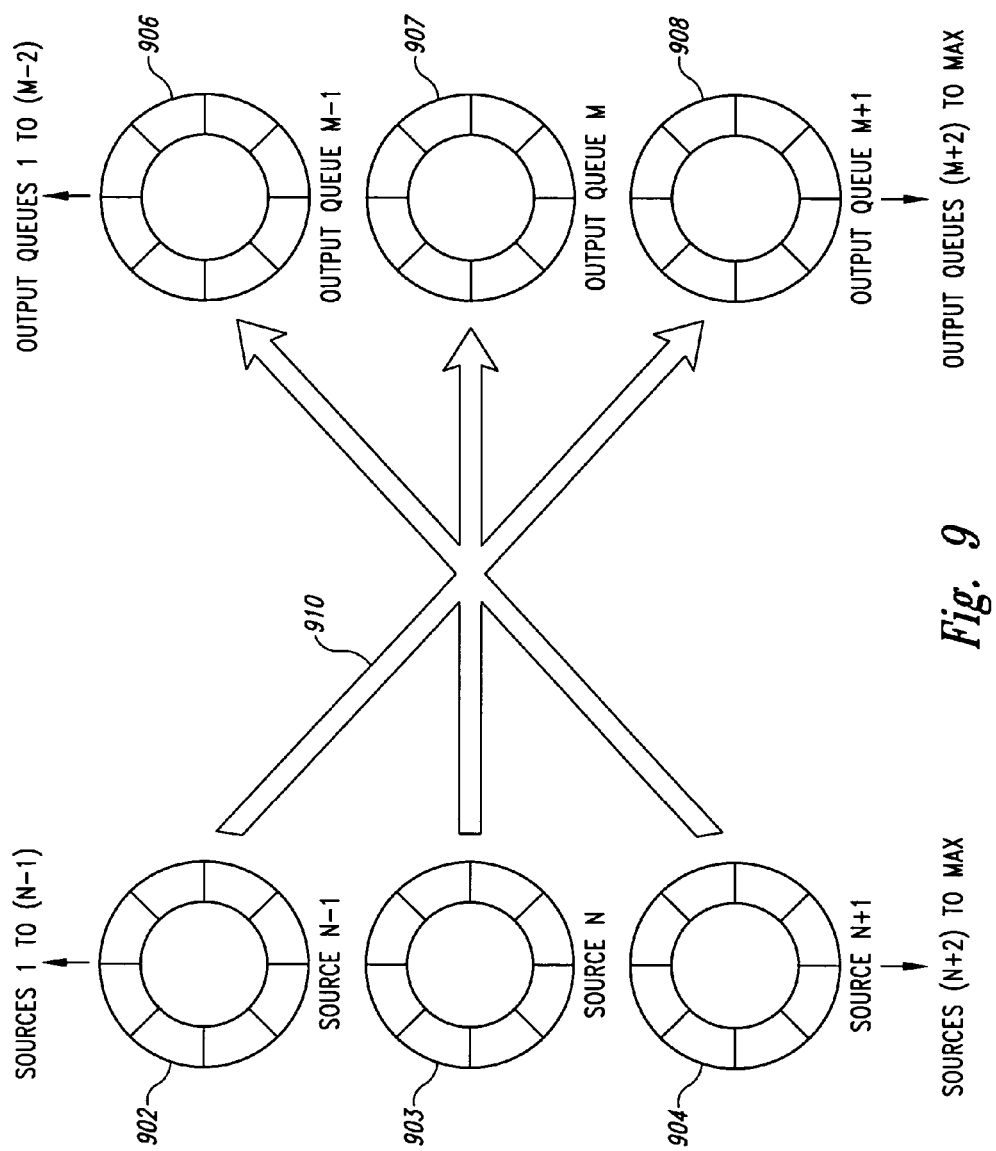
FIG. 9 provides an abstract view of network multiplexer functionality used for illustrating various network multiplexer problems and their solutions.

FIG. 9 provides an abstract view of network multiplexer functionality used for illustrating various network multiplexer problems and their solutions. The communications packet forwarding activity of the network multiplexer will be abstractly represented as moving message descriptors from a number of receive queues 902-904 associated with network multiplexer ports, called "sources" in the subsequent discussion, to a number of transmit queues 906-908 associated with network multiplexer ports. The forwarding paths 910 of FIG. 9 are meant to indicate that message descriptors may be moved from a given receive queue to any of the transmit queues. Of course, ports within a network multiplexer are each associated with a receive queue and a transmit queue, as shown in FIG. 7, and so any one of the sources 902 may be associated, together with any one of the transmit queues 906-908, with a single port. However, for the sake of clarity, the simplified approach of FIG. 9 can be used to abstractly illustrate resource monopolization problems and solutions to those problems.

Figure 10:
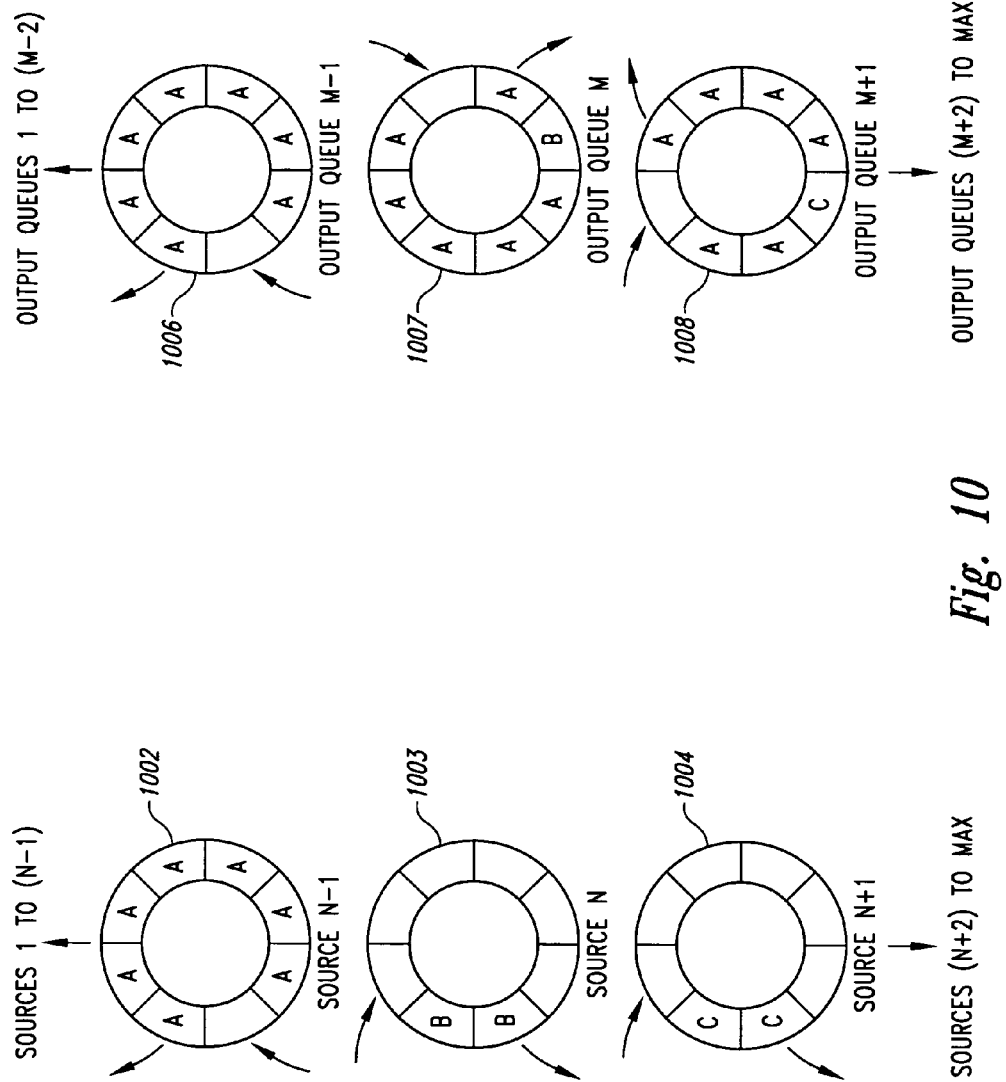
FIG. 10 illustrates a communications packet transfer problem associated with disparities in the rates of communications packet reception by different ports of a network multiplexer.

FIG. 10 illustrates a communications packet transfer problem associated with disparities in the rates of communications packet reception by different ports of a network multiplexer. In FIG. 10, the port associated with receive queue 1002 is receiving communications packets at a much higher rate than the ports associated with receive queues 1003 and 1004, and at a higher rate than the received communications packets can be transmitted by the network multiplexer by ports 1006-1008. In FIG. 10, message descriptors referencing communications packets arriving via the port associated with receive queue 1002 are labeled "A," while message descriptors referencing communications packets received via the ports associated with receive queues 1003 and 1004 are labeled "B" and "C," respectively. Because of the high rate of reception of communications packets via the port associated with receive queue 1002, the port associated with receive queue 1002 tends to monopolize transmit queues 1006-1008 at the expense of the ports associated with receive queues 1003 and 1004, increasing the transmission delay times and rate of packet loss for network devices connected to the network multiplexer via sources 1003 and 1004.

Figure 11:
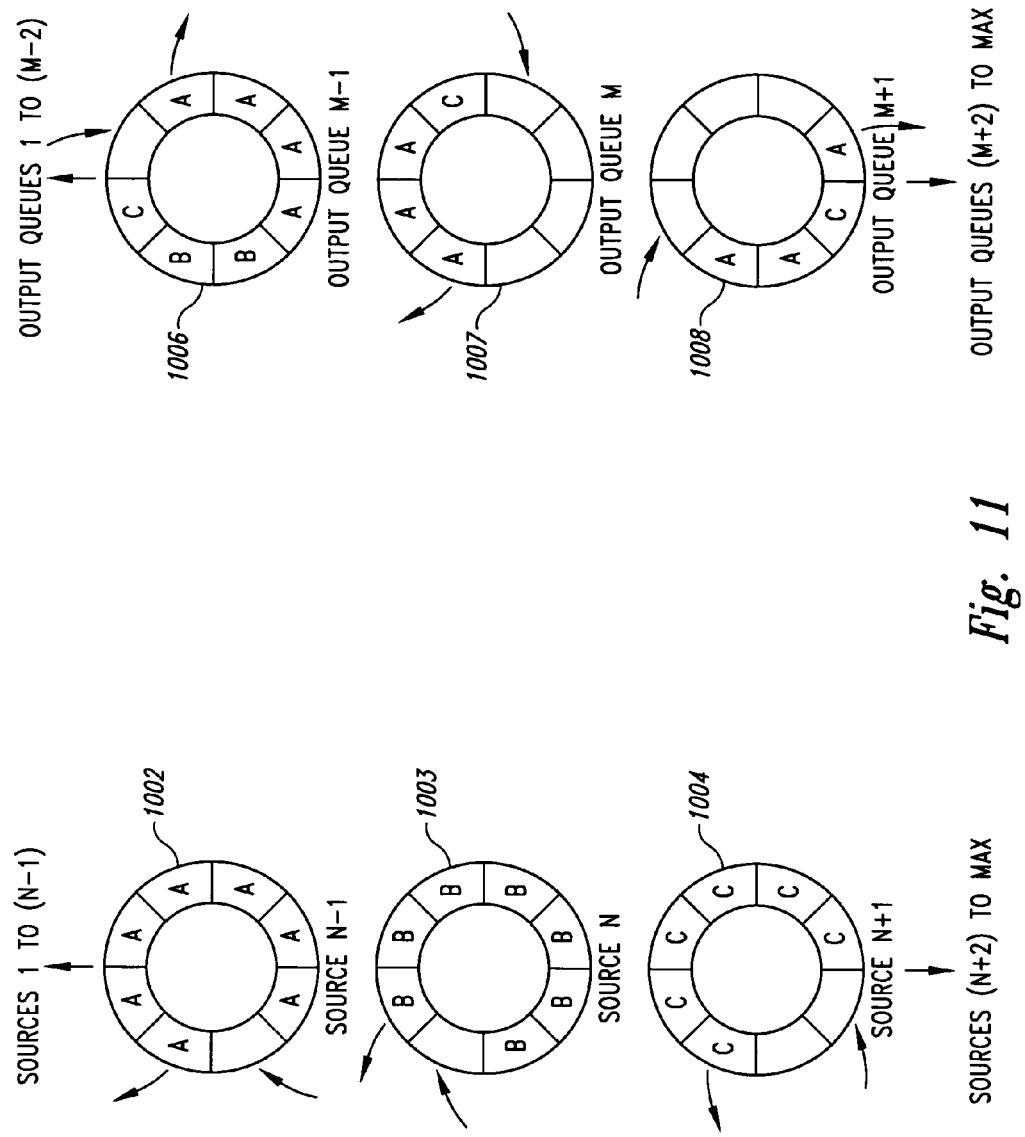
FIG. 11 illustrates a communications packet transfer problem associated with disparities in the rates of communications packet transmission by different ports of a network multiplexer.

FIG. 11 illustrates the problem of FIG. 10 continuing despite application of flow control. The numerical labels used for transmit and receive queues are identical to those used in FIG. 10. In FIG. 11, flow control has been applied to the network medium associated with receive queue 1002 in an attempt to prevent additional reception of communications packets through receive queue 1002 and thus prevent additional packet loss. With receive queue 1002 essentially halted, message descriptors have begun to move from receive queues 1003 and 1004 into transmit queues 1006-1008, and messages descriptors have begun to be removed from transmit queues 1006-1008 and begun to be transmitted by the ports associated with transmit queues 1006-1008. However, because, in this scenario, communications packets continue to arrive at the ports associated with receive queues 1003 and 1004 faster than they can be transmitted by the port associated with transmit queue 1006, communications packets received through receive queues 1003 and 1004 may still need to be dropped by the network multiplexer for lack of space in transmit queue 1006. Thus, despite flow control exercised in response to overflow of receive queues, a situation may arise, as shown in FIG. 11, where the network multiplexer has a continued capacity for forwarding received communications packets from ports associated with receive queues to ports associated with transmit queues, but must still drop packets because of a mismatch in reception and transmission rates for different ports.

Figure 12:
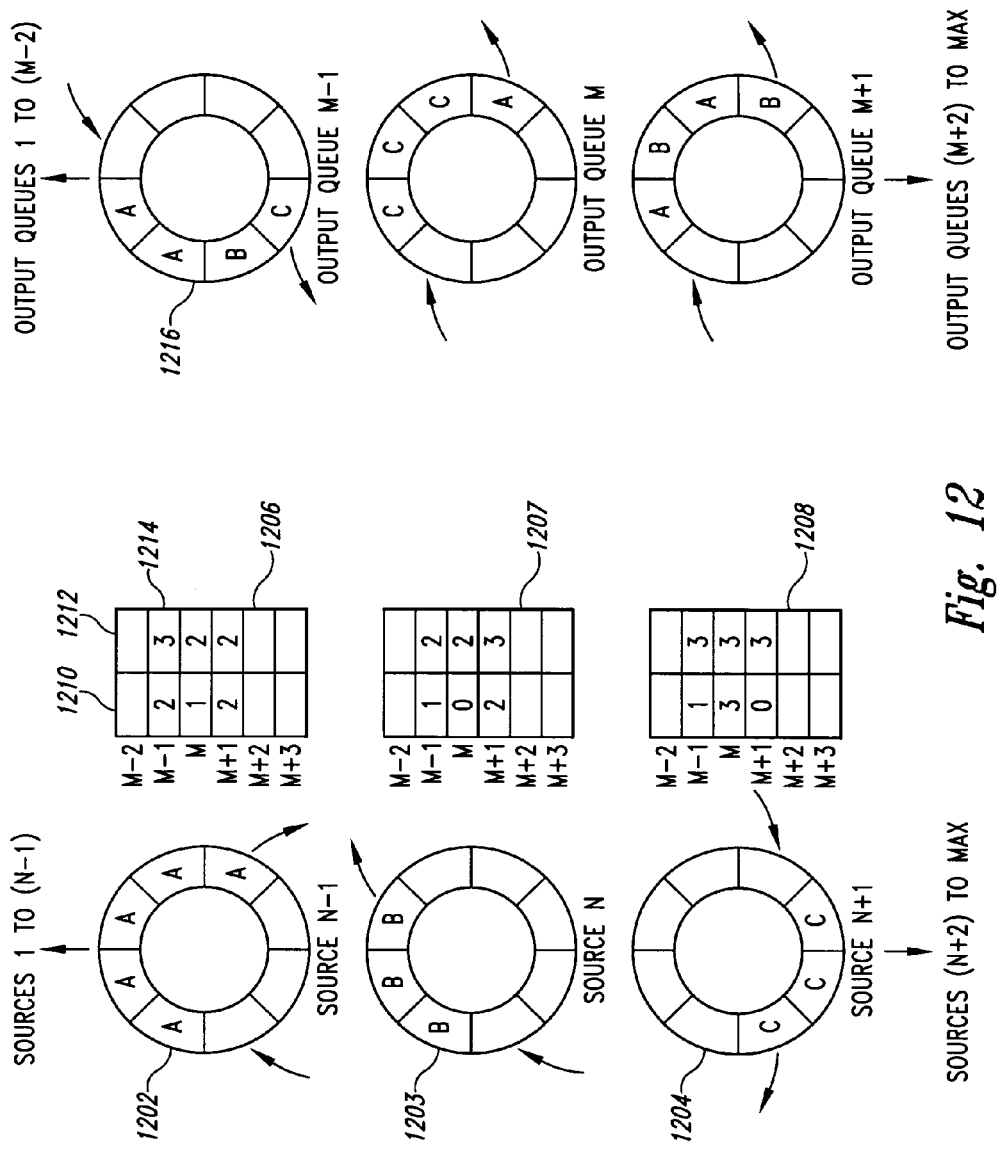
FIG. 12 illustrates a comprehensive solution to problems of the type illustrated in FIGS. 10 and 11.

FIG. 12 illustrates a comprehensive solution to problems of the types illustrated in FIGS. 10 and 11. This solution is based on the ability of ports to undertake flow control at either the hardware or network protocol level in order to prevent, for a period of time, transmission of communications packets to the port via the network medium connected to the port. The strategy illustrated in FIG. 12 is to allot a portion of each transmit queue to each source, and to require that sources initiate flow control to prevent further reception of communications packets that need to be forwarded to transmit queues for which the source has exceeded the source's allotted portion. In FIG. 12, the three sources 1202-1204 are associated with allotment tables 1206-1208, respectively. Each allotment table has two columns, such as column 1210 and 1212 of allotment table 1206. The first column 1210 indicates the number of message descriptors currently queued to each transmit queue by the source associated with the allotment table. The second column 1212 contains indications of the maximum number of message descriptors that a source may have concurrently queued to each transmit queue. Thus, each row in the allotment tables 1206-1208 describes the extent to which the allotted capacity of a particular transmit queue is currently being used by the source associated with the allotment table. For example, row 1214 of allotment table 1206 indicates that source 1202 currently has two message descriptors queued to transmit queue "M-1" and that source 1202 may have a maximum of three message descriptors concurrently queued to transmit queue "M-1." Transmit queue "M-1" 1216 contains two message descriptors labeled "A," indicating that the message descriptors were queued to transmit queue "M-1" by source 1202. When a transmit queue dequeues and processes a message descriptor, the transmit queue must access the allotment table associated with the source that queued the message descriptor and update the value in the first column of the row corresponding to the transmit queue. When a source queues a message descriptor to a particular transmit queue, the source must update the value in the first column of the row of the source's allotment table corresponding to that transmit queue. A source may not exceed its allotted portion of a transmit queue, and must undertake hardware or protocol-level flow control to prevent overflow of the source while the source waits for message descriptors that the source queued to a transmit queue to be dequeued and processed by the associated port. By using the technique illustrated in FIG. 12, a network multiplexer can guarantee that no source can unfairly scarce resources, and can guarantee that disparities in reception or transmission rates do not result in underutilization of network multiplexer resources. However, implementation of this technique requires complex logic for accessing and updating allotment tables as well as provision of significant memory resources for storing the contents of allotment tables. In general, this technique is too complex and resource intensive for economic utilization within network multiplexers, particularly network multiplexers with many ports in which control logic is implemented as logic circuits within an integrated circuit ("IC").

FIGS. 13A-J illustrate the method of the present invention. FIGS. 13A-J employ the same conventions used in FIGS. 9-12. Three receive queues 1302-1304 associated with ports, called "sources," are shown in the left-hand side of each of FIGS. 13A-J, and three transmit queues 1306-1308 associated with ports are shown in the right-hand side of FIGS. A-J. Each of transmit queues 1306-1308 are associated with two values 1310-1312. The first of the two values represents a high threshold and the second of the two values represents a low threshold. For example, the high threshold 1316 for transmit queue 1306 is 10, and the low threshold 1316 for transmit queue 1306 is 5. Each source is associated with a list of transmit queues 1318-1320 from which the source has received a flow control directive from the transmit queue. As discussed above, a network multiplexer port is associated both with a receive queue and a transmit queue, and thus source 1302 may be associated, together with one of transmit queues 1306-1308, with a particular network port. However, for the sake of illustration, the sources and transmit queues are shown in FIGS. 13A-J as separate entities.

The list of transmit queues 1318-1320 are, in the implementation illustrated in FIGS. 13A-J, bit arrays where each of three bits in each of the lists corresponds to one of the transmit queues. For example, the first bit 1322 in list 1318 corresponds to transmit queue 1306, the second bit 1324 in list 1318 corresponds to transmit queue 1307, and the third bit 1326 in list 1318 corresponds to transmit queue 1308. When a transmit queue sends a flow control directive to a source, the bit corresponding to that transmit queue in the list associated with the source is set to one. When a transmit queue sends a release flow control directive to the source, the bit in the list for that source corresponding to the transmit queue is cleared.

In the method of the present invention, when a source attempts to queue a message descriptor to a transmit queue, and the transmit queue is full, then the message descriptor is simply discarded. When a source attempts to queue a message descriptor to a transmit queue already containing a number of message descriptors greater than the high threshold, then the transmit queue sends a flow control directive to the source to direct the source to employ hardware or protocol-level flow control procedures in order to temporarily prevent reception of additional communications packets by the source. When the number of message descriptors queued within the transmit queue has equaled or exceeded the high threshold value, and then falls below one less than the high threshold value, then a source may queue a message descriptor to the transmit queue without receiving a flow control directive. When the number of message descriptors in a transmit queue has equaled or exceeded the high threshold value, and the number of entries has fallen below the low threshold value, then the transmit queue sends release flow control messages to any sources to which the transmit queue had sent flow control messages during the time when the number of queued message descriptors equaled or exceeded the high threshold. However, a transmit queue will not release sources from flow control until the number of queued message descriptors falls below the low threshold.

An alternative method similar method to the method described in the above paragraph may also be employed. In the alternative method, after the number of message descriptors in a transmit queue has equaled or exceeded the high threshold and until the number of message descriptors in the transmit queue has fallen below the low threshold associated with the transmit queue, any source attempting to add new message descriptors to the transmit queue will be flow controlled. Only first method will be described in detail below. However, the above-described alternative method, and other alternative methods for deciding when to initiate and release flow control are intended to be encompassed within the present invention.

In this discussion, transmit queues are referred to as sending flow control directives and release flow control messages and sources are referred to as receiving and acting upon those flow control directives and release flow control messages. However, in reality, all such operations are performed by software or firmware routines, or by logic circuits, that implement the control logic of a network multiplexer. Thus, for example, sending of a flow control directive may simply constitute setting of a bit in a list associated with a source by the control logic of the network multiplexer. In FIGS. 13A-J, message descriptors referencing communications packets received by source 1302 are labeled "A," message descriptors referencing communications packets received by source 1303 are labeled "B," and message descriptors received by source 1304 are labeled "C." Each source may forward message descriptors to any of the transmit queues 1306-1308. FIGS. 13A-J represent successive snapshots in time of the states of the sources and transmit queues along with their associated lists and threshold values, in order to illustrate operation of a network multiplexer employing the method of the present invention.

Figure 13A:
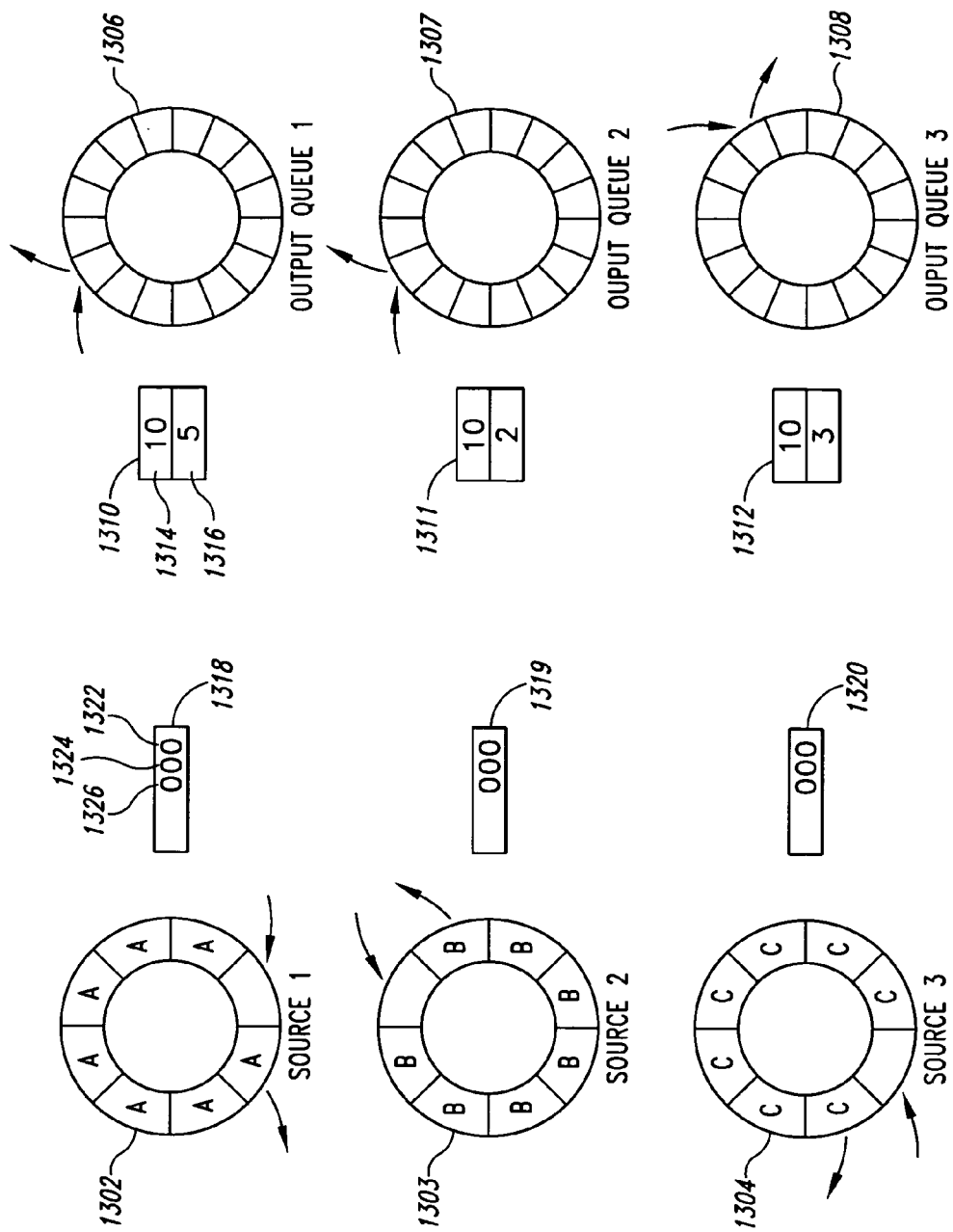
FIGS. 13A-J illustrate the method of the present invention.
Figure 13B:
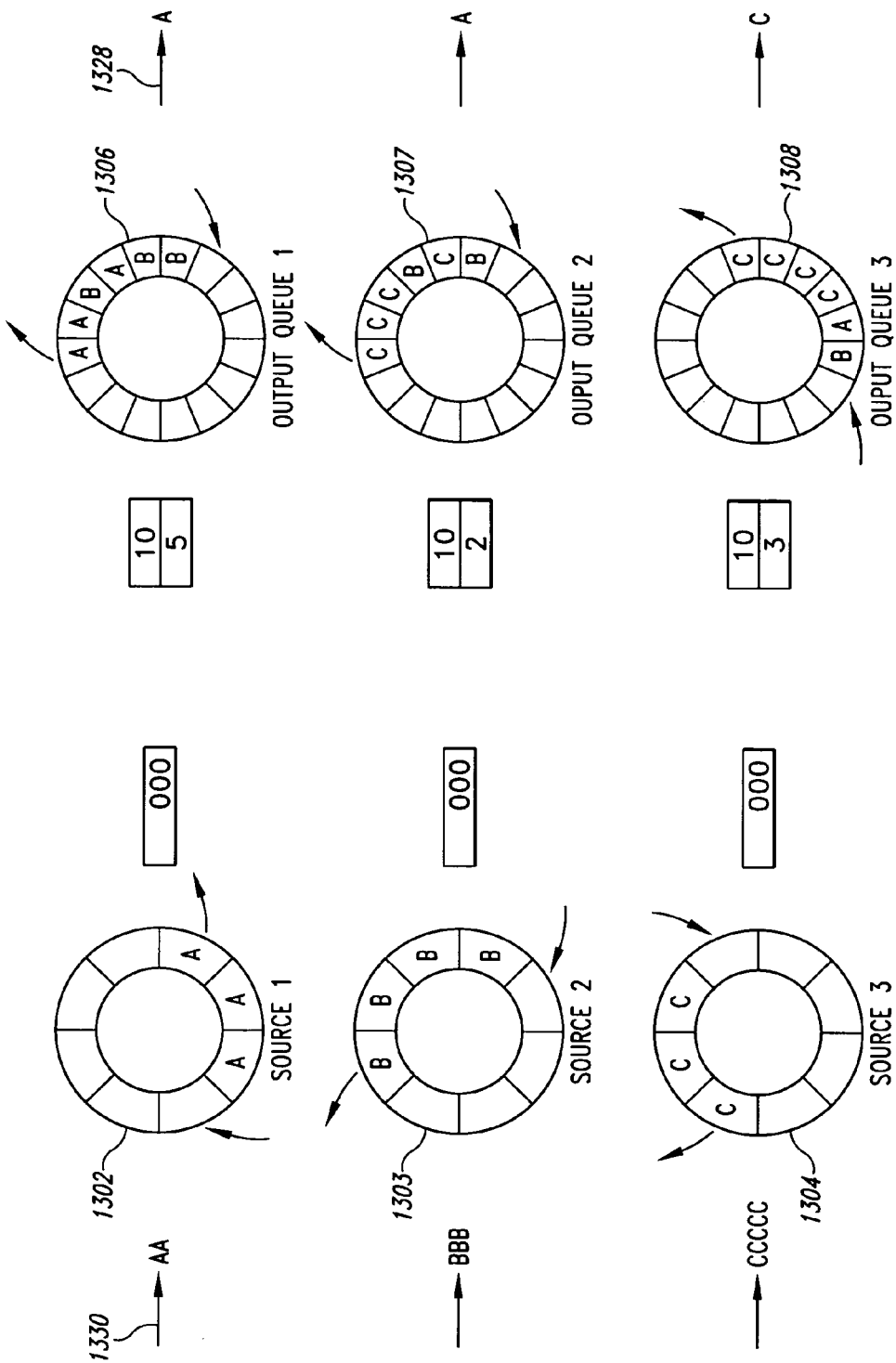

In FIG. 13A, transmit queues 1306-1308 are empty and sources 1302-1304 are filled with message descriptors that need to be forwarded to the transmit queues. In FIG. 13B, sources 1302-1304 have transferred a number of message descriptors to the transmit queues and contain additional message descriptors referencing newly arrived communications packets. In addition, each of the transmit queues has dequeued a message descriptor and transmitted the corresponding communications packet. The message descriptors transmitted by the transmit queues are indicated by outgoing arrows, such as outgoing arrow 1328 followed by a message descriptor indicator "A," and the newly received communications packets are indicated on the left-hand side of FIG. 13B with input arrows, such as input arrow 1330, followed by two message descriptor labels "AA" indicating that two communications packets have been received by source 1302. Thus, for example, source 1302 has, since the time illustrated in FIG. 13A, received two additional communications packets and has queued four message descriptors to transmit queue 1306 and one message descriptor each to transmit queues 1307 and 1308. Transmit queue 1306 has dequeued one of the message descriptors queued to transmit queue 1306 by source 1302 and transmitted the corresponding communications packet, as has transmit queue 1307.

Figure 13C:
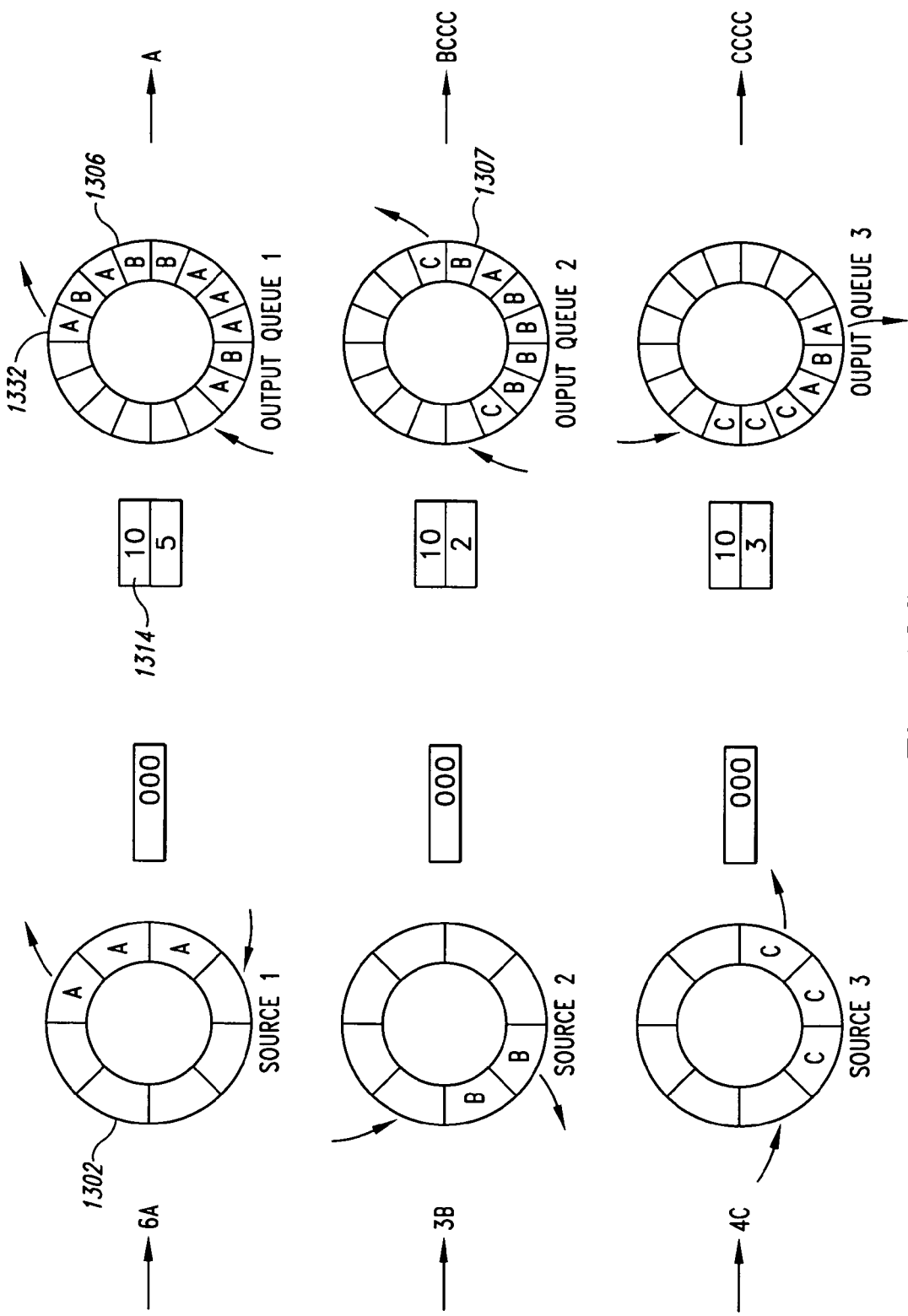
Figure 13D:
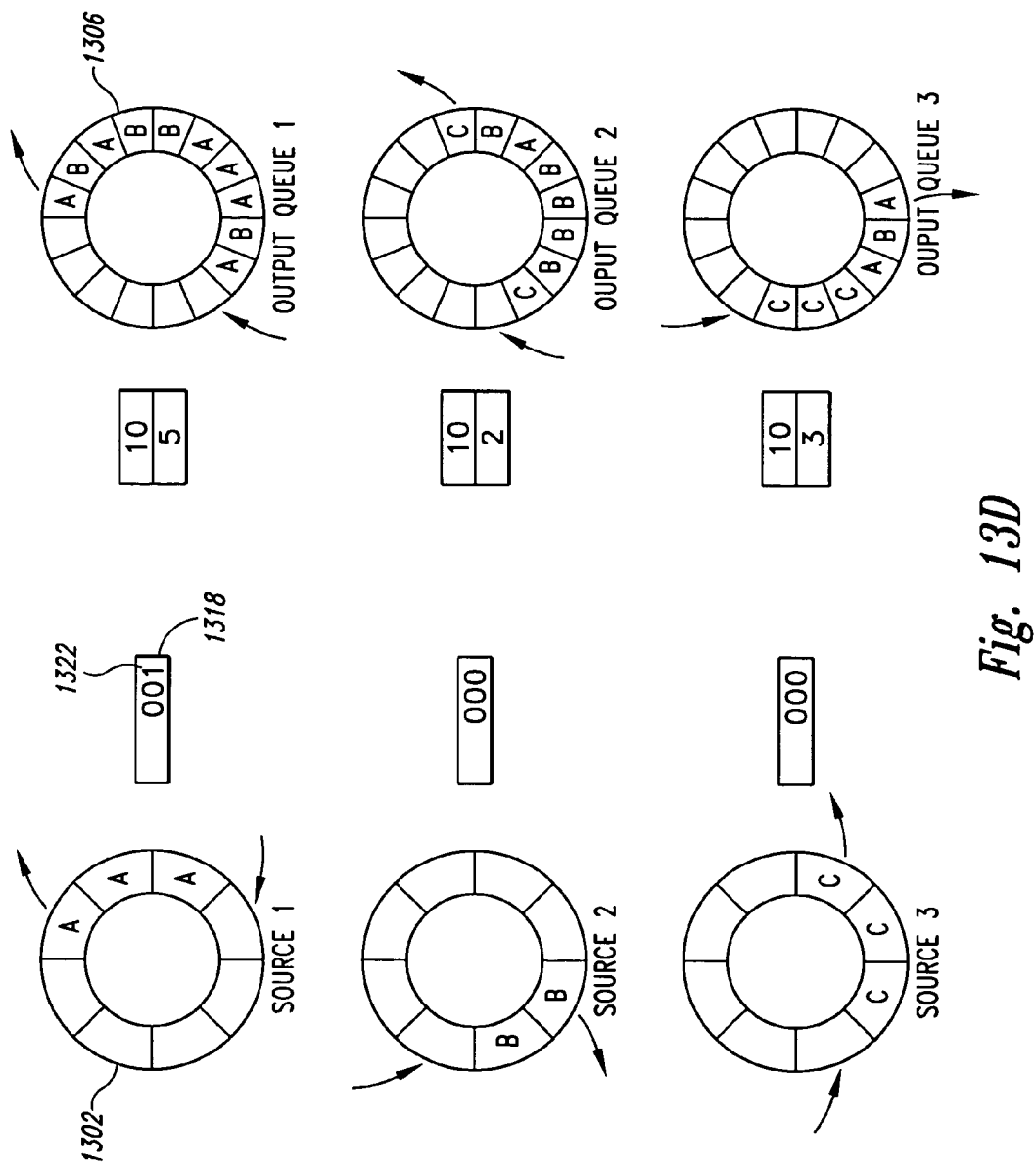

In FIG. 13C, more time has elapsed, and message descriptors have continued to flow from sources to transmit queues. However, in the intervening time, the transceivers of the ports associated with transmit queues 1306 and 1307 have experienced back up delays, and are therefore beginning to back up. Output queue 1306 contains ten queued message descriptors, and has therefore reached the high threshold value of ten. Therefore, source 1302, that queued the most recently queued message descriptor 1332 to transmit queue 1306, is due to receive a flow control directive from transmit queue 1306. In FIG. 13D, source 1302 has received the flow control directive from transmit queue 1306, and the bit 1322 corresponding to transmit queue 1306 in the list 1318 associated with source 1302 has been set to "1."

In the current implementation, once a source receives a flow control directive, it may transfer an additional two already-queued message descriptors to transmit queues and may, in turn, receive an additional two communications packets prior to successfully terminating reception of communications packets via hardware or protocol-level flow control. Although two additional transfers are allowed and two additional receptions may be anticipated in the current example, the maximum number of additional communications packets that may arrive at a port following initiation of flow control is a function of the latency or response time of the flow control mechanism employed for the network medium associated with a given port. Thus, different additional transfer allowances may be assigned to different ports depending on the latency or response time of the flow control mechanism used by the network media associated with the different ports.

Figure 13E:
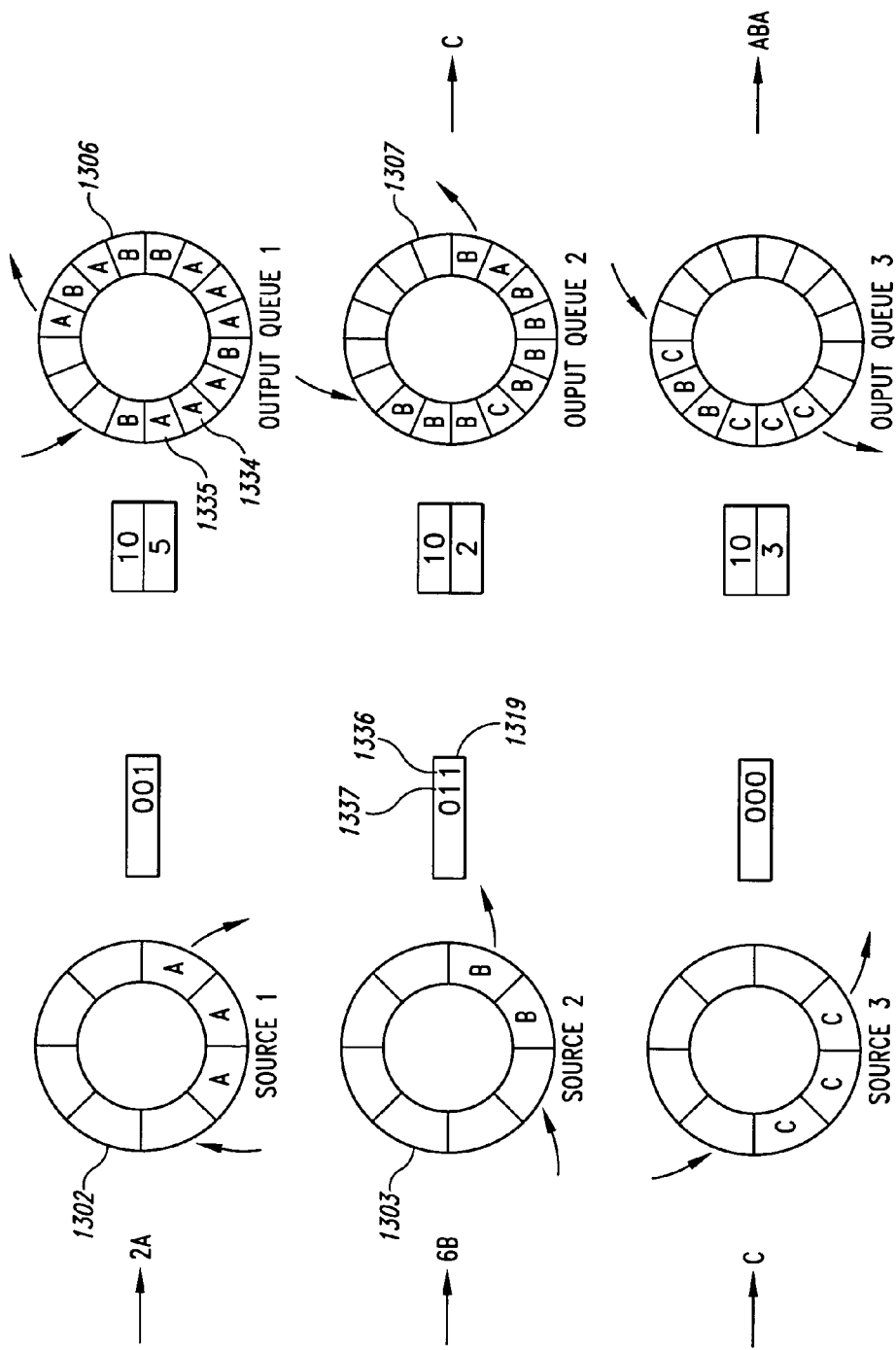

Thus, in FIG. 13E, source 1302 has received an additional two communications packets before flow control prevented additional communications packets from arriving at source 1302 and has queued a corresponding number of message descriptors, and has transferred an additional two message descriptors 1334-1335 to transmit queue 1306. By accounting for the number of message descriptors that can be transferred from a source after the source receives a flow control directive, the network multiplexer can guarantee that no message descriptors will be discarded by setting the high threshold levels of transmit queues sufficiently lower than the total capacities of the transmit queues to ensure that, if all sources forward the worst-case number of message descriptors to a particular output queue following receipt of flow control directives, there will be sufficient capacity remaining in the transmit queue to accommodate those forwarded message descriptors.

In FIG. 13E, both transmit queues 1306 and 1307 are above their high threshold values, and, since source 1303 has queued message descriptors to transmit queues 1306 and 1307 that are both past their high threshold values, source 1303 has received flow control directives from both transmit queues 1306 and 1307, indicated in the list 1319 associated with source 1303 by the two "1" bits 1336 and 1337.

Figure 13F:
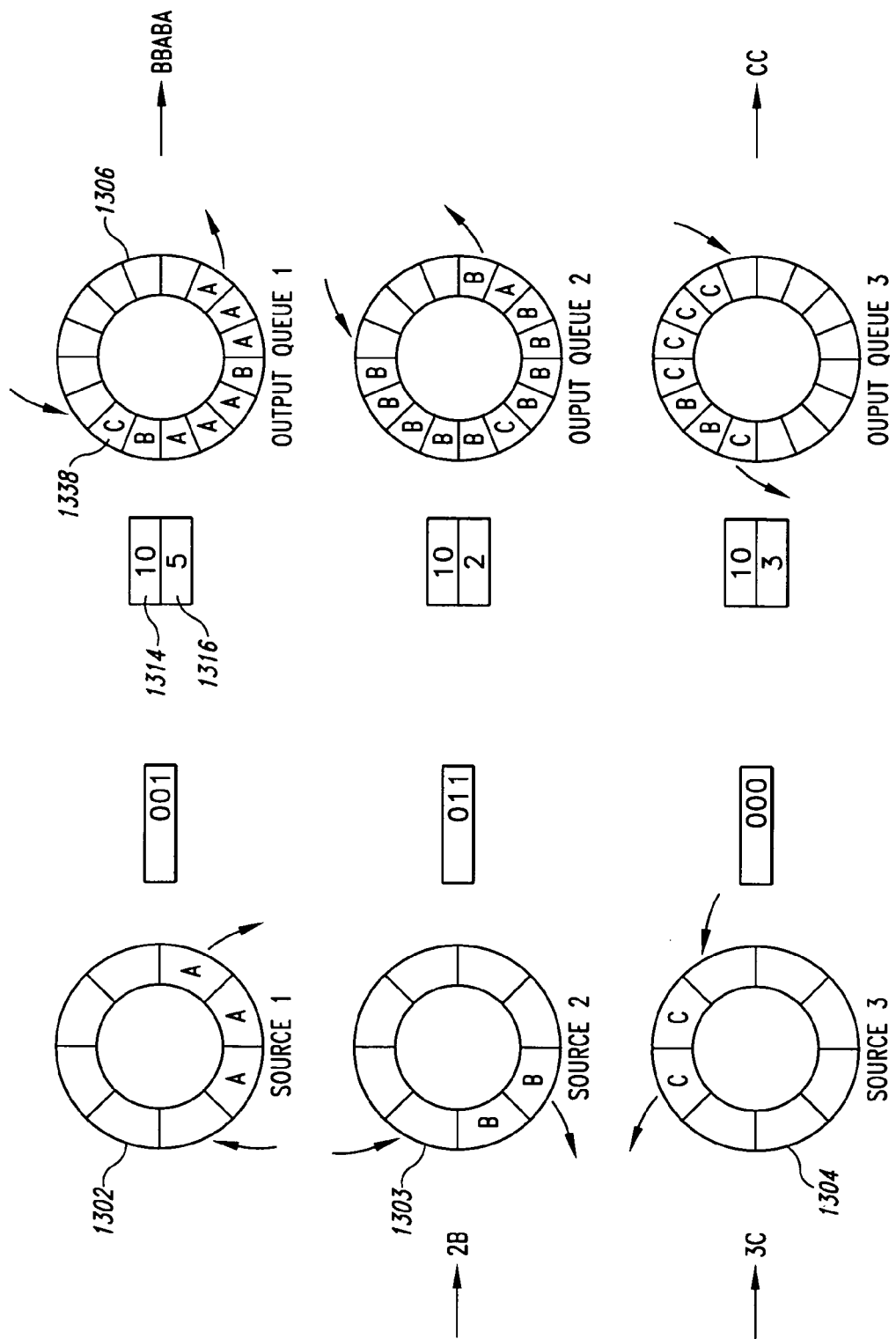

In FIG. 13F, the transceiver of the port associated with transmit queue 1306 has resumed transmitting communications packets, and the number of message descriptors queued to transmit queue 1306 has fallen below the high threshold value 1314. Therefore, although source 1304 has queued a message descriptor 1338 to transmit queue 1306, source 1304 has not received a flow control directive from transmit queue 1306. However, because the number of message descriptors in transmit queue 1306 has not fallen below the low threshold 1316, sources 1302 and 1303 remain flow controlled. In the alternative method discussed above, source 1304 would receive a flow control directive.

Figure 13G:
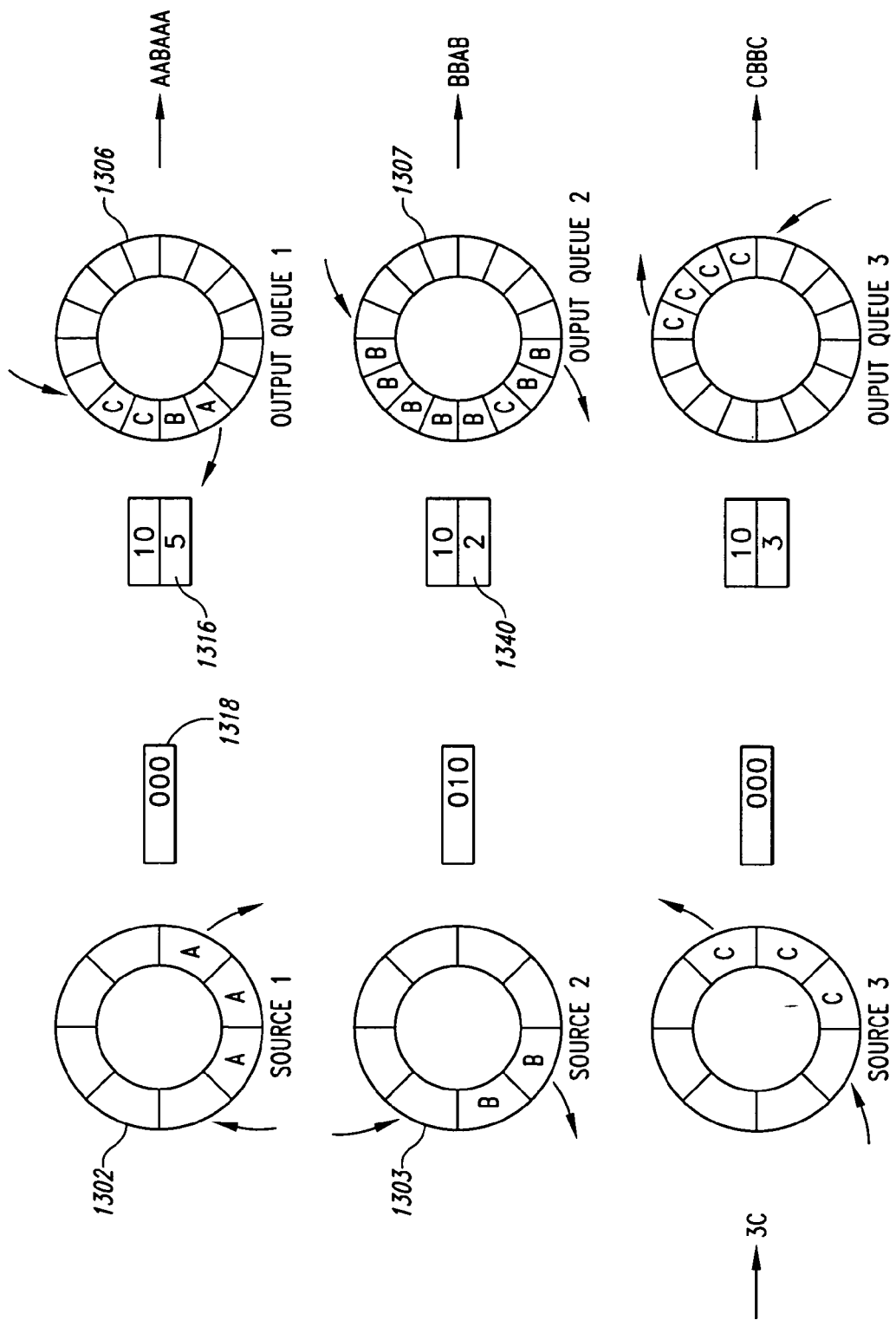

In FIG. 13G, the number of message descriptors queued to transmit queue 1306 has fallen below the low threshold 1316, and therefore transmit queue 1306 has sent release flow control messages to both sources 1302 and 1303. Receipt of the release flow control message by source 1302 has cleared all bits in the list 1318 associated with source 1302, and 1302 can now undertake hardware or network protocol operations to restore the flow of incoming communications packets, and can resume forwarding message descriptors to transmit queues. However, source 1303 remains flow controlled because transmit queue 1307 continues to contain a greater number of message descriptors than the low threshold 1340 associated with transmit queue 1307.

Figure 13H:
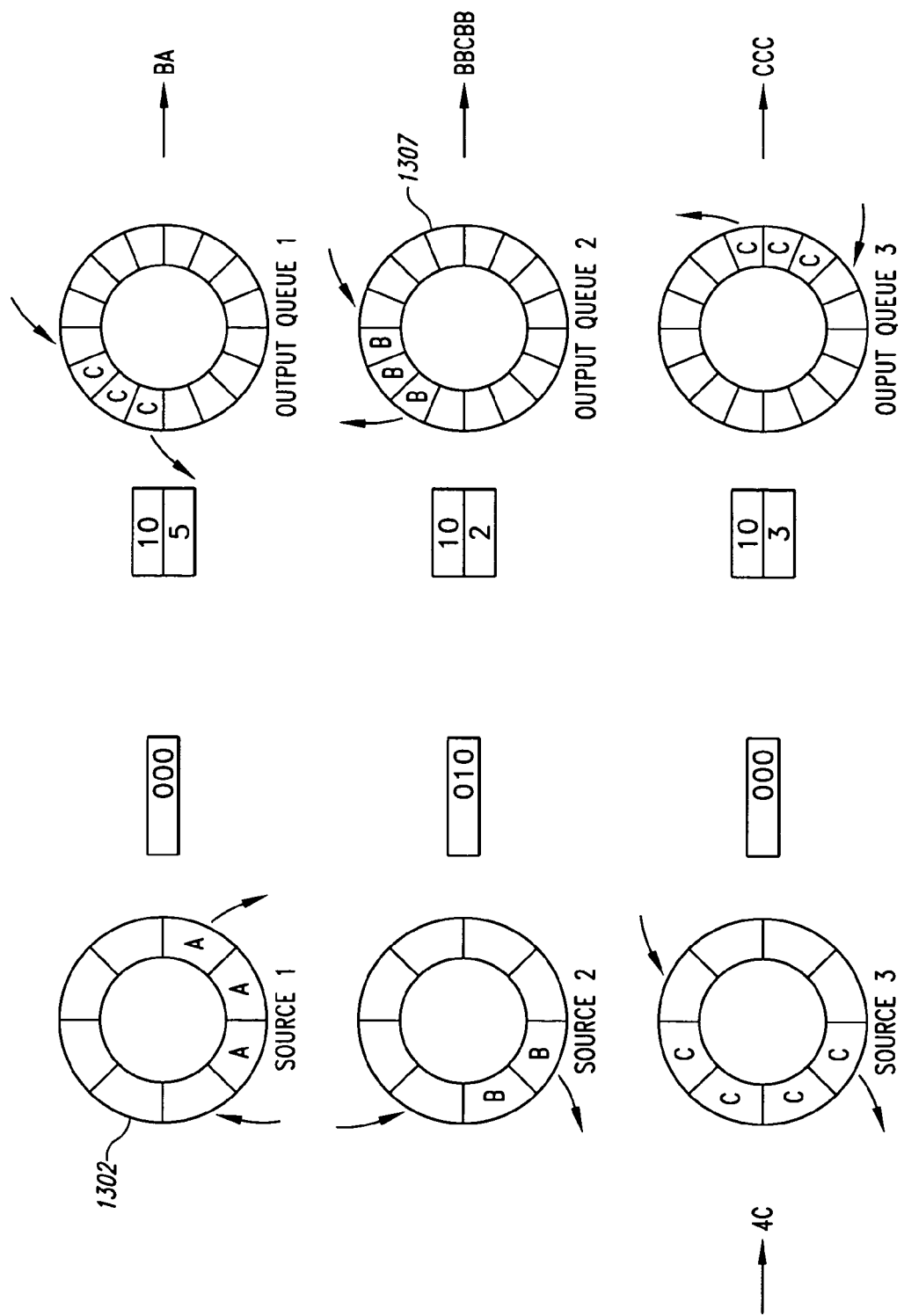
Figure 13I:
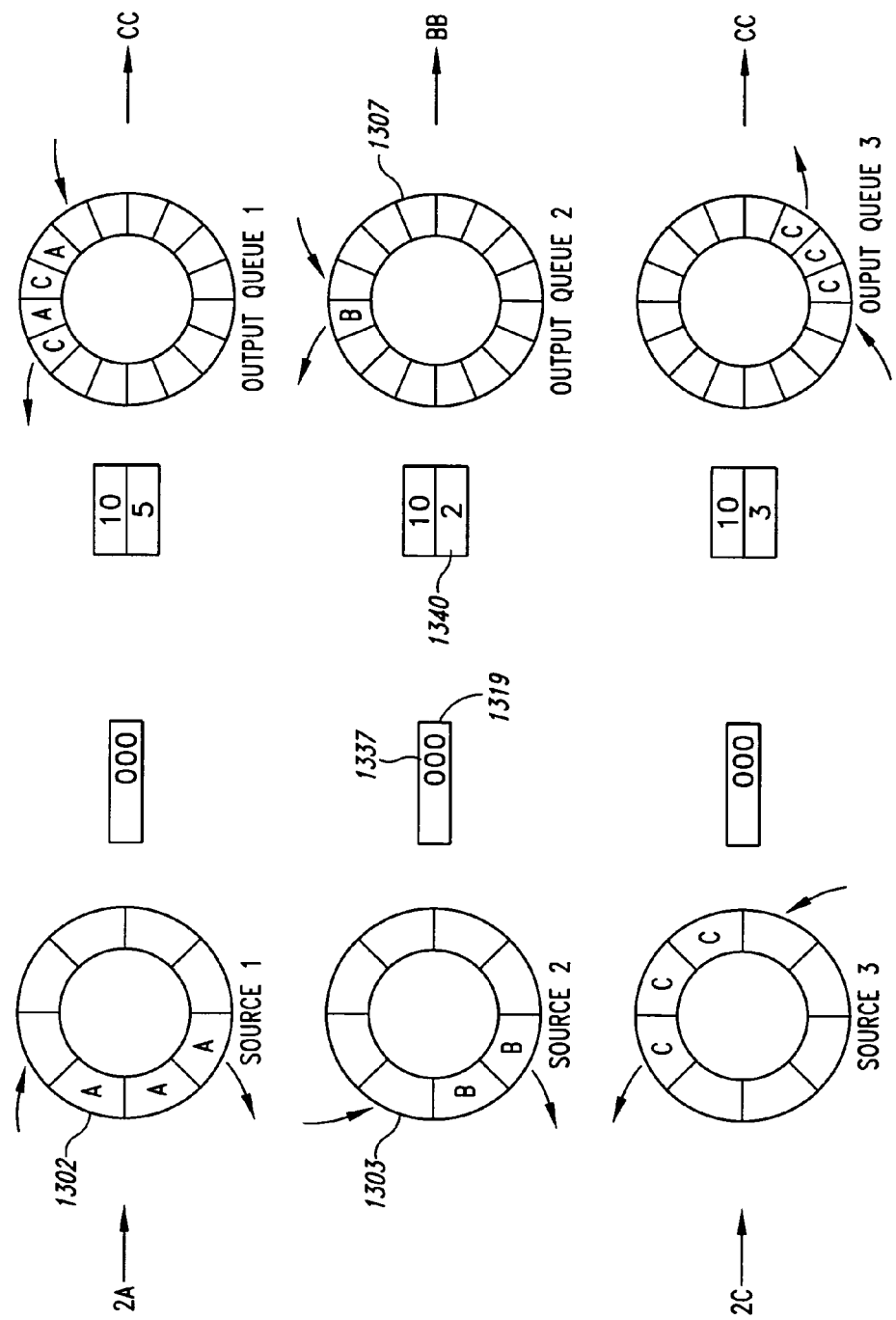
Figure 13J:
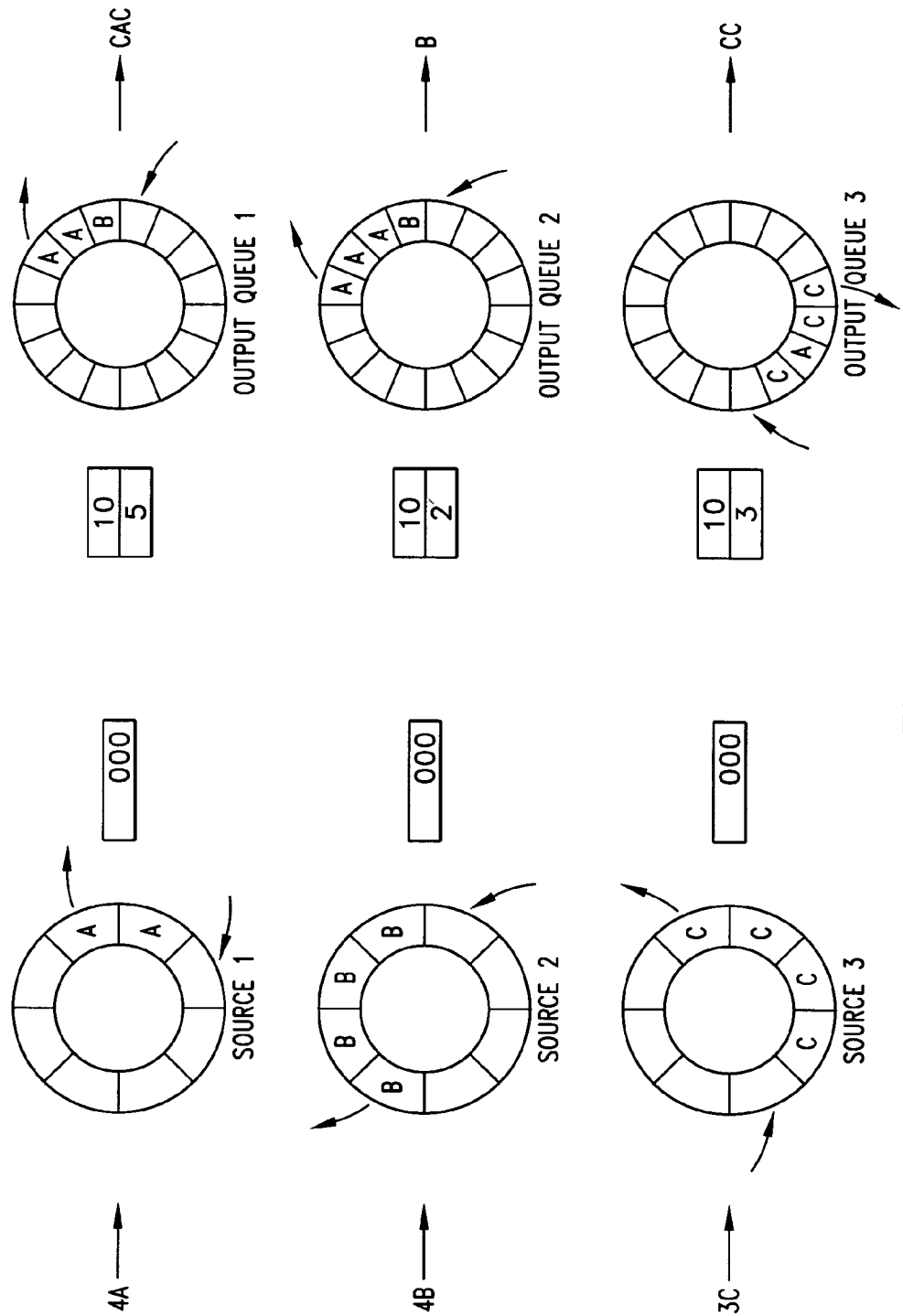

In FIG. 13H, the transceiver of the port associated with transmit queue 1307 has continued transmitting communications packets, and the number of message descriptors with transmit queue 1307 has begun to decrease. In FIG. 13I, the number of message descriptors in source 1307 has fallen below the low threshold 1340, and therefore transmit queue 1307 has sent a release flow control message to source 1303, clearing bit 1337 in the list 1319 associated with source 1303. Note also that source 1302 has resumed receiving communications packets and forwarding message descriptors. Finally, in FIG. 13J, all sources and transceivers associated with the transmit queues are fully functional.

Thus, the method of the present invention employs a single array of bits for each source and two threshold values for each transmit queue, rather than extensive allocation tables of the technique illustrated in FIG. 12, to selectively initiate flow control on ports in order to fairly distribute resource allocation among ports. The method of the present invention requires only sending of flow control directives and release flow control messages from transmit queues to sources, in practical implementations commonly implemented as simple bit-set and bit-clear operations executed by the network multiplexer control functionality. The method of the present invention requires far less complex logic and less memory and processing resources than the technique illustrated in FIG. 12.

FIGS. 14A-F provide C++-like pseudo-code implementations of the method of the present invention. In FIGS. 14A-C class declarations are given for a number of classes used in the pseudo-code implementation. For the most part, implementations of the member functions of these classes are not shown. These member functions can be readily implemented by an ordinarily skilled software practitioner and, moreover, many alternate implementations are possible. In FIGS. 14D-F, implementations for five member functions that illustrate the method of the present invention are provided.

In FIG. 14A, the classes "message" and "messageDescriptor" are declared on lines 4-18 and 20-34, respectively. An instance of the class "message" is a communications packet, and an instance of the class "messageDescriptor" represents a message descriptor that refers to a communications packet and that may be queued and dequeued from receive and transmit queues. In FIG. 14B, the class "cQueue" is declared on lines 36-53 and the class "transceiver" is declared on lines 55-66. An instance of the class "cQueue" is a receive queue or transmit queue associated with a port. The class "cQueue" includes the following public methods: (1) "empty," which returns a Boolean value indicating whether or not the queue is empty; (2) "full," which returns a Boolean value indicating whether or not the queue is full; (3) "num," which returns an integer value indicating the number of message descriptors queued within the queue; (4) "queueMDesc," which queues a message descriptor to the queue; and (5) "dequeueMDesc," which dequeues a message descriptor from the queue. An instance of the class "transceiver" represents a transceiver associated with the port. The transceiver includes the following public member functions: (1) "flowControl," which initiates hardware or network-protocol-level flow control by the transceive; (2) "releaseFlowControl," which releases flow control initiated by a call to member function "flowControl," allowing the transceiver to resume receiving communications packets; (3) "kick," a member function called by port or network multiplexer logic to awaken the transceiver to check the states of the receive queue and transmit queue; and (4) "startTransceiver," an initialization member function called by a port to initiate transceiver operation. A transceiver fetches message descriptors from a transmit queue and transmits the communications packets stored in the memory of the network multiplexer referenced by the message descriptors and receives communications packets from a network, placing them into memory referenced by message descriptors in the receive queue of a port. Finally, in FIG. 14B, the class "portList" is declared on lines 70-80. This class may be implemented in many different ways, including a bit array implementation used in FIGS. 13A-J, or, when used for storing indications of received flow control directives, may simply be an integer that is incremented or decremented by a port upon receiving flow control directives and release flow control messages, respectively. The class "portList" includes the following public member functions: (1) "addPort," which adds an indication of a port from which a flow control directive has been received to an instance of the class "portList;" (2) "removePort," which removes an indication of a port from an instance of the class "portList;" (3) "firstPort," a member function that returns a pointer to the port having a first indication of the instance of the class "portList;" (4) "nextPort," which returns a pointer to an additional port having an indication in an instance of the class "portList;" (5) "in," which returns a Boolean value indicating whether or not the port referenced by the pointer argument "p" currently has an indication within an instance of the class "portList;" (6) "empty," which returns a Boolean value indicating whether or not an instance of the class "portList" is empty; and (7) "clear," which clears all indications from an instance of the class "portList."

In FIG. 14C, the class "portDirectory" is declared on lines 82-86. The single public member function "getPortFromSource" declared for this class translates a network address supplied as argument "sid" to a pointer to a port. Next, in FIG. 14C, the class "port" is declared on lines 88-110. This class represents a network multiplexer port, including the associated receive and transmit queues, the high and low thresholds, the lists of ports from which a port has received flow control directives, and a transceiver. The following ten data members are declared on lines 91-100 for the class "port:" (1) "receiveQueue," the receive queue associated with the port; (2) "transmitQueue," the transmit queue associated with the port; (3) "overflow," a Boolean data member indicating whether or not the transmit queue of the port has contained at least as many message descriptors as the high threshold more recently than the transmit queue associated with the port has contained less message descriptors than the low threshold; (4) "flowControlled," a Boolean data member that indicates whether the port is currently flow controlled; (5) "highThreshold," the high threshold for the port; (6) "lowThreshold," the low threshold for the port; (7) "controlled," a list of indications of the ports to which the port has sent flow control directives; (8) "controlledBy," a list of indications of the ports from which the port has received flow control directives; (9) "portDir," a pointer to a pointer directory that translates network addresses to port references; and (10) "portHardware," the transceiver associated with the port. The class "port" contains the following public functions: (1) "receiveMessage," which is called by a calling port to forward a message descriptor from the calling port to the instant port; (2) "incomingMessage," called by the transceiver "portHardware" when the transceiver has received a communications packet from the network and queued a message descriptor to the receive queue; (3) "outgoingMessage," called by the transceiver "port hardware" when the transceiver has dequeued a message descriptor from the transmit queue and transmitted a communication packet; (4) "receiveflowFlowControl," called by a calling port to send a flow control directive to the instant port; (5) "receiveFlowControlRelease," called by a calling port to send a release flow control message to the instant port; and (6) "port," a constructor that initializes the port for operation.

Implementations of the six public member functions of the class "port" are provided in FIGS. 14D-F, and embody the method of the present invention. FIG. 14D shows the implementation of port member functions "receiveMessage" on lines 1-17 and "incomingMessage" on lines 19-39. The member function "receiveMessage" takes a message descriptor "m" and a reference to a calling port "sPort" as arguments. This member function is called by a calling port to forward a message descriptor to the instant port. The member function receiveMessage determines, on line 3, whether by adding message descriptor "m" to the transmit queue associated with the instant port, the transmit queue will contain a number of message descriptors equal to or greater than the high threshold, and, if so, receiveMessage sends a flow control directive to the calling port on line 7 and adds the calling port to the list of ports "controlled" that are flow controlled by the instant port on line 8 in the case that the calling port has not yet received a flow control directive from the instant port, as determined by receiveMessage on line 5. The member function receiveMessage notes, in this case, on line 10, that an overflow condition is occurring. If the transmit queue is not full, as detected by receiveMessage on line 12, whether or not the high threshold has been exceeded, receiveMessage queues the message descriptor "m" to the transmit queue and calls the transceiver member function "kick" to notify the transceiver of a newly queued message.

The member function "incomingMessage" is called by the transceiver upon queuing a message descriptor to the receive queue. If the port is not flow controlled, as detected on line 24 by examining the data member "controlledBy," then if the port was previously flow controlled, as detected on line 26, incomingMessage sets "flowControlled" to FALSE on line 28 and calls the transceiver function "release flowControl" on line 29 to allow the instant port to resume receiving communications packets. Then, in the while-loop of lines 31-36, messages descriptors are dequeued from the receive queue associated with the instant port and forwarded to destination ports. Finally, upon depleting the receive queue, incomingMessage calls the transceiver member function "kick" on line 37 to notify the transceiver that message descriptors may have been removed from the receive queue of the instant port.

In FIG. 14E the port member function "outgoingMessage" is implemented on lines 41-56 and the port member function "receiveFlowControl" is implemented on lines 58-74. The member function "outgoingMessage" is called by the transceiver of the instant port following dequeuing of a message descriptor by the transceiver from the transmit queue. On line 45, outgoingMessage determines if the transmit queue has been in an overflow condition and dequeuing of a message descriptor by the transceiver has resulted in the transmit queue falling below the low threshold. If so, then outgoingMessage sets the data member "overflow" to FALSE on line 47 and, in the for-loop comprising lines 49-53, sends release flow control messages to all ports earlier flow controlled by the instant port.

The member function "receiveFlowControl" is called by a calling port to send a flow control directive to the instant port. The instant port adds an indication of the calling port to the instant port's lists of ports from which it has received flow control directives, "controlledBy," and then initiates transceiver-mediated flow control on line 65. Optionally, as discussed with reference to FIGS. 13A-J, the instant port may be allowed to forward some number of already-queued message descriptors from its receive queue to the transmit queues of destination ports in the for-loop of lines 68-73.

The port member function "receiveFlowControlRelease" is implemented on lines 76-80 of FIG. 14F and the constructor for the class "port" is implemented on lines 81-92 of FIG. 14F. The member function "receiveFlowControlRelease" is called by a calling port to send a release flow control message to the instant port. The instant port removes an indication of the calling port from its list "controlledBy" on line 78 and then calls the instant port's member function "incomingMessage" to begin forwarding already-queued message descriptors to transmit queues if instant port is no longer flow controlled. Finally, the constructor for the class "port" initializes the data members of an instance of the class "port" for initial operation. The low and high threshold values are supplied as arguments "low" and "high" and a pointer to an instance of the port directory class is supplied as argument "p." In the last statement on line 90, the port constructor starts operation of the transceiver "portHardware."

Although the present invention has been described in terms of a particular embodiment, it is not intended that the invention be limited to this embodiment. Modifications within the spirit of the invention will be apparent to those skilled in the art. For example, the present invention may be implemented either as software or firmware routines using any number of different programming languages for use within any number of different types of network multiplexers. In addition, the present invention may be implemented as logic circuits included within an integrated circuit that implements the control functionality of a network multiplexer. Different types of techniques can be used to store, access, and maintain lists of ports to which flow control directives have been sent and lists of ports, or counts, of the number of flow control directives received. The method of the present invention may be applied to multiplexers containing any number of different ports.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for initiating flow control in a network multiplexer that forwards a message descriptor referencing a communications packet received by a receiving port to one or more transmit queues, each transmit queue associated with a transmitting port which transmits communications packets queued to the transmit queue, the method comprising:
  providing each transmitting port in the network multiplexer with a high threshold and a low threshold;
  when a message descriptor is queued to a transmit queue associated with a transmitting port,
    when the transmit queue currently contains a maximum number of message descriptors, discarding the message descriptor, and
    when the transmit queue currently contains a number of message descriptors equal to or greater than the high threshold of the associated transmitting port, sending a flow control request to the receiving port that received the communications packet referenced by the queued message descriptor.

2. The method of claim 1 further including:
  when a message descriptor is queued to a transmit queue associated with a transmitting port,
  when the transmit queue currently contains a number of message descriptors greater than or equal to the low threshold of the associated transmitting port, but the number of message descriptors contained in the transmit queue exceeded or equaled the high threshold of the associated transmitting port more recently than the number of message descriptors contained in the transmit queue was equal to the low threshold of the associated transmitting port, sending a flow control request to the receiving port that received the communications packet referenced by the queued message descriptor.

3. The method of claim 1 further including:
  when a transmitting port transmits a packet referenced by a message descriptor to a destination port,
  releasing the message descriptor, and when the destination port currently contains a number of queued message descriptors equal to one less than the destination port's low threshold, sending a release flow control request to any receiving ports to which a flow control request was sent while the transmit queue contained a number of message descriptors equal to or greater than the high threshold of the associated transmitting port.

4. The method of claim 2 further including:
when a transmitting port transmits a packet referenced by a message descriptor to a destination port,
releasing the message descriptor, and
when the destination port currently contains a number of queued message descriptors one less than the destination port's low threshold, sending a release flow control request to any receiving ports to which a flow control request was sent while the transmit queue contained a number of message descriptors greater than or equal to the low threshold of the associated transmitting port.

5. The method of claim 4 further including:
when a receiving port is flow controlled and receives a number of release flow control requests equal to the number of received flow control requests,
releasing flow control by the receiving port.

6. A network multiplexer system that links physically separate network media by forwarding packets received from each network medium to a number of network media, the network multiplexer system comprising:
a number of ports, each port having a transceiver and a communications controller;
a memory;
an internal bus for transferring packets from ports to memory and from memory to ports;
a receive queue and a transmit queue associated with each port that contain message descriptors that each references a communications packet stored in memory;
a high threshold and a low threshold associated with each transmit queue;
an indication of ports to which flow control requests have been made associated with each port; and
an indication of the number of flow control requests made to a port associated with each port,
wherein, when a message descriptor is queued to a transmit queue associated with a transmitting port,
when the transmit queue currently contains a number of message descriptors equal to or greater than the high threshold of the associated transmitting port, sending a flow control request to the receiving port that received the communications packet referenced by the queued message descriptor.

7. The network multiplexer of claim 6 wherein, when a message descriptor is forwarded to a port for transmission, and when the transmit queue of the port is full, the message descriptor is dropped.

8. The network multiplexer of claim 6 wherein, when a message descriptor is forwarded to a port for transmission, and when the transmit queue of the port contains a number of message descriptors greater than or equal to the high threshold associated with the port, a flow control request is sent to the port that received the communications packet referenced by the message descriptor and a indication that a flow control request has been sent to the port that received the communications packet is saved by the port to which the message descriptor is forwarded.

9. The network multiplexer of claim 6 wherein, when a message descriptor is forwarded to a port for transmission, and when the transmit queue of the port has contained a number of message descriptors greater than or equal to the high threshold associated with the port more recently than the transmit queue of the port has contained a number of message descriptors less than the low threshold associated with the port, a flow control request is sent to the port that received the communications packet referenced by the message descriptor and a indication that a flow control request has been sent to the port that received the communications packet is saved by the port to which the message descriptor is forwarded.

10. The network multiplexer of claim 6 wherein, when a port removes a message descriptor from the transmit queue associated with the port, and when the number of messages contained in the transmit queue currently equal one less than the low threshold associated with the port, a release flow control message is sent to each port referenced by indications saved by the port.

* * * * *